(12) United States Patent
Smith et al.

(10) Patent No.: US 12,545,660 B2
(45) Date of Patent: Feb. 10, 2026

(54) CRYSTALLINE FORMS OF A FARNESOID X RECEPTOR AGONIST

(71) Applicant: ELI LILLY AND COMPANY, Indianapolis, IN (US)

(72) Inventors: Nicholas D. Smith, San Diego, CA (US); Robert Mansfield, San Diego, CA (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 587 days.

(21) Appl. No.: 17/906,582

(22) PCT Filed: Mar. 17, 2021

(86) PCT No.: PCT/US2021/022790
§ 371 (c)(1),
(2) Date: Sep. 16, 2022

(87) PCT Pub. No.: WO2021/188692
PCT Pub. Date: Sep. 23, 2021

(65) Prior Publication Data
US 2023/0147756 A1    May 11, 2023

Related U.S. Application Data

(60) Provisional application No. 62/991,213, filed on Mar. 18, 2020.

(51) Int. Cl.
*C07D 401/14* (2006.01)
*A61K 45/06* (2006.01)
(52) U.S. Cl.
CPC ............ *C07D 401/14* (2013.01); *A61K 45/06* (2013.01); *C07B 2200/13* (2013.01)

(58) Field of Classification Search
CPC .. C07D 401/14; A61K 45/06; A61K 31/4439; C07B 2200/13; A61P 1/16; A61P 1/00; A61P 29/00
See application file for complete search history.

(56) References Cited

U.S. PATENT DOCUMENTS

| 6,645,980 | B1 | 11/2003 | Cuny et al. |
| 8,212,006 | B2 | 7/2012 | Downes et al. |
| 10,077,268 | B2 | 9/2018 | Evans et al. |

(Continued)

FOREIGN PATENT DOCUMENTS

| CN | 1914205 A | 2/2007 |
| CN | 102083835 A | 6/2011 |

(Continued)

OTHER PUBLICATIONS

Anderson, Neal. (2012). Crystallization and Purification. 10.1016/B978-0-12-386537-3.00012-5 (Year: 2012).*

(Continued)

*Primary Examiner* — Clinton A Brooks
*Assistant Examiner* — Izabela Schmidt
(74) *Attorney, Agent, or Firm* — Gabriel Magallanes

(57) ABSTRACT

Described herein is the farnesoid X receptor agonist, 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, including crystalline forms and pharmaceutically acceptable salts, solvates, and formulations thereof.

8 Claims, 8 Drawing Sheets

(56) References Cited

U.S. PATENT DOCUMENTS

| | | | |
|---|---|---|---|
| 10,301,268 B2 | 5/2019 | Evans et al. | |
| 11,084,817 B2* | 8/2021 | Smith | C07D 487/04 |
| 11,773,094 B2* | 10/2023 | Smith | C07D 409/14 |
| | | | 546/268.1 |
| 2006/0009459 A1 | 1/2006 | Chakka et al. | |
| 2006/0069070 A1 | 3/2006 | Fiorucci et al. | |
| 2006/0223879 A1 | 10/2006 | Downes et al. | |
| 2008/0081824 A1 | 4/2008 | Zheng et al. | |
| 2008/0280916 A1 | 11/2008 | Bilich et al. | |
| 2009/0270418 A1 | 10/2009 | Sloss et al. | |
| 2010/0063018 A1 | 3/2010 | Pellicciari et al. | |
| 2010/0197591 A1 | 8/2010 | Aspnes et al. | |
| 2012/0115869 A1 | 5/2012 | Crosignani et al. | |
| 2014/0039007 A1 | 2/2014 | Tully et al. | |
| 2014/0155247 A1 | 6/2014 | Aoyagi et al. | |
| 2015/0258052 A1 | 9/2015 | Evans et al. | |
| 2015/0342930 A1 | 12/2015 | Kinzel et al. | |
| 2017/0066724 A1 | 3/2017 | Evans et al. | |
| 2017/0096418 A1 | 4/2017 | Patron et al. | |
| 2018/0000768 A1 | 1/2018 | Fang et al. | |
| 2018/0116993 A1 | 5/2018 | Li et al. | |
| 2018/0251429 A1 | 9/2018 | Smith et al. | |
| 2019/0062277 A1 | 2/2019 | Smith et al. | |
| 2020/0092932 A1 | 3/2020 | Youn et al. | |
| 2020/0290973 A1 | 9/2020 | Smith et al. | |
| 2021/0395253 A1 | 12/2021 | Smith et al. | |
| 2023/0120914 A1 | 4/2023 | Smith et al. | |
| 2023/0131804 A1 | 4/2023 | Song et al. | |
| 2023/0147756 A1 | 5/2023 | Smith et al. | |
| 2023/0382913 A1 | 11/2023 | Smith et al. | |

FOREIGN PATENT DOCUMENTS

| | | |
|---|---|---|
| CN | 103502221 A | 1/2014 |
| CN | 105477636 A | 4/2016 |
| CN | 107126419 A | 9/2017 |
| FR | 2839974 A1 | 11/2003 |
| JP | 2006199656 A | 8/2006 |
| JP | 2007530582 A | 11/2007 |
| JP | 2010077109 A | 4/2010 |
| MY | 144229 A | 8/2011 |
| WO | WO-0069810 A1 | 11/2000 |
| WO | WO-0071518 A2 | 11/2000 |
| WO | WO-0185694 A2 | 11/2001 |
| WO | WO-0192226 A1 | 12/2001 |
| WO | WO-0224649 A1 | 3/2002 |
| WO | WO-0230927 A1 | 4/2002 |
| WO | WO-02098852 A2 | 12/2002 |
| WO | WO-2004009549 A2 | 1/2004 |
| WO | WO-2004026823 A1 | 4/2004 |
| WO | WO-2004009549 A3 | 6/2004 |
| WO | WO-2004045511 A2 | 6/2004 |
| WO | WO-2004046068 A2 | 6/2004 |
| WO | WO-2004046162 A2 | 6/2004 |
| WO | WO-2004096771 A1 | 11/2004 |
| WO | WO-2005011655 A2 | 2/2005 |
| WO | WO-2004046162 A8 | 3/2005 |
| WO | WO-2005058822 A1 | 6/2005 |
| WO | WO-2005113522 A1 | 12/2005 |
| WO | WO-2007110237 A2 | 10/2007 |
| WO | WO-2008065500 A2 | 6/2008 |
| WO | WO-2009076747 A1 | 6/2009 |
| WO | WO-2009106991 A2 | 9/2009 |
| WO | WO-2010001869 A1 | 1/2010 |
| WO | WO-2011006935 A2 | 1/2011 |
| WO | WO-2011008915 A1 | 1/2011 |
| WO | WO-2012011081 A1 | 1/2012 |
| WO | WO-2012129495 A1 | 9/2012 |
| WO | WO-2013037482 A1 | 3/2013 |
| WO | WO-2014133414 A2 | 9/2014 |
| WO | WO-2015036442 A1 | 3/2015 |
| WO | WO-2015040425 A1 | 3/2015 |
| WO | WO-2015138969 A1 | 9/2015 |
| WO | WO-2015138986 A1 | 9/2015 |
| WO | WO-2016149111 A1 | 9/2016 |
| WO | WO-2017018751 A1 | 2/2017 |
| WO | WO-2017049172 A1 | 3/2017 |
| WO | WO-2017049173 A1 | 3/2017 |
| WO | WO-2017049176 A1 | 3/2017 |
| WO | WO-2017049177 A1 | 3/2017 |
| WO | WO-2017078928 A1 | 5/2017 |
| WO | WO-2017170182 A1 | 10/2017 |
| WO | WO-2018170165 A1 | 9/2018 |
| WO | WO-2018170166 A1 | 9/2018 |
| WO | WO-2018170167 A1 | 9/2018 |
| WO | WO-2018170173 A1 | 9/2018 |
| WO | WO-2018170182 A1 | 9/2018 |
| WO | WO-2018215002 A1 | 11/2018 |
| WO | WO-2020061112 A1 | 3/2020 |
| WO | WO-2020061113 A1 | 3/2020 |
| WO | WO-2020061114 A1 | 3/2020 |
| WO | WO-2020061115 A1 | 3/2020 |
| WO | WO-2020061116 A1 | 3/2020 |
| WO | WO-2020061117 A1 | 3/2020 |
| WO | WO-2020061118 A1 | 3/2020 |
| WO | WO-2021188688 A1 | 9/2021 |
| WO | WO-2021188692 A1 | 9/2021 |
| WO | WO-2021188695 A1 | 9/2021 |

OTHER PUBLICATIONS

Gege, Christian et al. Nonsteroidal FXR Ligands: Current Status and Clinical Applications. Handb Exp Pharmacol 256:167-205 (2019).

Ali et al. Recent advances in the development of farnesoid X receptor agonists. Ann Transl Med 3(1):5 (2015).

Amidon et al. Colon-Targeted Oral Drug Delivery Systems: Design Trends and Approaches, AAPS PharmSciTech 16(4):731-741 (2015).

Beaulieu et al., Preparation of 2-amido benzoic acid compounds as viral polymerase inhibitors. Chemical Abstracts Service. Database accession No. 2009:771969 (2009).

Berge et al. Pharmaceutical Salts. Journal of Pharmaceutical Sciences 66(1):1-19 (Jan. 1977).

Bernstein. Crystal Structure Prediction and Polymorphism. ACA Transactions 39:14-23 (2004).

Boss et al., Preparation of N-benzyl N-piperidin-4-yl benzamides as inhibitors of parasitic aspartyl protease. Chemical Abstracts Service. Database accession No. 2005:570873 (2005).

Boss et al., Preparation of piperidines for the treatment of central nervous system disorders. Chemical Abstracts Service. Database accession No. 2004:80651 (2004).

Boss et al., Preparation of substituted amino-aza-cycloalkanes as anti-malarial agents. Chemical Abstracts Service. Database accession No. 2002:240729 (2002).

Boss et al., Achiral, cheap, and potent inhibitors of Plasmepsins I, II, and IV. ChemMedChem. 1(12):1341-1345 (2006).

Braeuer et al. Evolutionary chemistry approach toward finding novel inhibitors of the type 2 diabetes target glucose-6-phosphate translocase. CA, Chemical Abstracts Service, Columbus, Ohio, US, (2005), Database accession No. 2005:154377.

Braga et al. Making crystals from crystals: a green route to crystal engineering and polymorphism. J. Royal Soc. Chem. Commun 29:3635-3645 (2005).

Brauer et al., Evolutionary chemistry approach toward finding novel inhibitors of the type 2 diabetes target glucose-6-phosphate translocase. Journal of Combinatorial Chemistry. 7(2):218-226 (2005).

Bromidge et al., Preparation of biaryl compounds having activity at the 5-HT5A receptor. Chemical Abstracts Service. Database accession No. 2004:965222 (2004).

Brough et al., Preparation of resorcinol N-Aryl amide compounds, for use as pyruvate dehydrogenase kinase inhibitors. Chemical Abstracts Service. Database accession No. 2015:512259 (2015).

Bundgaard. Design and Application of Prodrugs. Textbook of Drug Design and Development. Krosgaard-Larsen and Bundgaard. Chapter 5. pp. 113-191 (1991).

Bundgaard. Means to Enhance Penetration: Prodrugs as a Means to Improve the Delivery of Peptide Drugs. Advanced Drug Delivery Review 8:1-38 (1992).

(56) References Cited

OTHER PUBLICATIONS

Camilleri. Bile Acid diarrhea: prevalence, pathogenesis, and therapy. Gut Liver 9(3):332-339 (2015).
CAS Registry No. 1349456-93-4. CA Index Name: [1,1?-biphenyl]-2-carboxylic acid, 4?-[[[[2-[[acetyl[4-(1-piperidinyl-methyl)phenyl]amino]methyl]cyclopropyl]carbonyl]amino]methyl]-3,3?-difluoro-, methyl ester. Entered STN: Dec. 6, 2011.
CAS Registry No. 485347-98-6; CA Index Name: acetamide, N-[2-(aminomethyl)-1H-benzimidazol-6-yl]-N-[[2-(phenylmethoxy)phenyl]methyl]—Entered STN: Feb. 4, 2003.
Chemical Abstract compound, STN express RN 1026708-50-8 (Entered STN: Jun. 9, 2008).
Chourasia et al. Pharmaceutical approaches to colon targeted drug delivery systems. J Pharm Pharm Sci. 6(1):33-66 (2003).
Costantino et al. Molecular Dynamics Simulation of the Ligand Binding Domain of Farnesoid X Receptor. Insights into Helix-12 Stability and Coactivator Peptide Stabilization in Response to Agonist Binding. J Med Chem 48:3251-3259 (2005).
Downes et al. A Chemical, Genetic, and Structural Analysis of the Nuclear Bile Acid Receptor FXR. Molecular Cell 11:1079-1092 (2003).
Erb et al. Sequential One-Pot Access to Molecular Diversity through Aniline Aqueous Borylation. J Organ Chem 79:10568-10580 (2014).
Fang et al. Intestinal FXR agonism promotes adipose tissue browning and reduces obesity and insulin resistance. Nat Med 21(2):159-165 (2015).
Fett et al., Preparation of oxadiazole and pyridazine derivatives as inhibitors of biosynthesis of triglycerides. Chemical Abstracts Service. Database accession No. 2012:125764 (2012).
Fu et al. Discovery of new non-steroidal FXR ligands via a virtual screening workflow based on Phase shape and induced fit docking. Bioorg Med Chem Lett 22(22):6848-6853 (2012).
Fu et al. Fibroblast growth factor 19 increases metabolic rate and reverses dietary and leptin-deficient diabetes. Endocrinology 145:2594-2603 (2004).
Gadaleta et al. Farnesoid X receptor activation inhibits inflammation and preserves the intestinal barrier in inflammatory bowel disease. Gut 60(4):463-472 (2011).
Gangloff et al. Synthesis of 3,5-disubstituted 1,2,4-oxadiazoles using tetrabutylammonium fluoride as a mild and efficient catalyst. Tetrahedron Letters 42(8):1441-1443 (2001).
Gege et al. Knocking on FXR's Door: The "Hammerhead"—Structure Series of FXR Agonists—Amphiphilic Isoxazoles with Potent In Vitro and In Vivo Activi-ties. Current Topics in Medicinal Chemistry 14:2143-2158 (2014).
Genin et al. Discovery of 6-(4-{[5-Cyclopropyl-3-(2,6-dichlorophenyl)isoxazol-4-yl]methoxy}piperidin-1-yl)-1-methyl-1H-indole-3-carboxylic Acid: A Novel FXR Agonist for the Treatment of Dyslipidemia. J Med Chem 58(24):9768-9772 (2015).
Hamada et al. Synthesis and antimicrobial evaluation of some heterocyclic chalcone derivatives. Molecules 16:2304-2312 (2011).
Hambruch et al. On the Pharmacologyof Farnesoid X Receptor Agonists: Give me an "A", Like an "Acid". Nuclear Receptor Research 3:Article ID 101207 (2016).
Honorio et al. 3D QSAR Comparative molecular field analysis on nonsteroidal farnesoid X receptor activators. J Mol Graph Model 25:921-927 (2007).
Honorio et al. Hologram quantitative structure-activity relationships for a series of farnesoid X receptor activators. Bioorg Med Chem Letts 15:3119-3125 (2005).
Hu et al. Predicting biological Functions of Compounds based on Chemical-Chemical Interactions. PLoS One 6(12):e29491 (2011).
Inagaki et al. Regulation of antibacterial defense in the small intestine by the nuclear bile acid receptor. PNA USA 103:3920-3925 (2006).
Johnson et al., Preparation of arylheterocyclylamides as motilin antagonists. Chemical Abstracts Service. Database accession No. 2001:833284 (2001).
Jones et al.: Pharmaceutical Cocrystals: An Emerging Approach to Physical Property Enhancement. MRS Bulletin 31:875-879 (2006).
Jursic et. al. Preparation of 5-substituted 2-methyl-1,3,4-oxadiazoles from 5-substituted tetrazoles and acetic anhydride. Synthetic Communications 24(11):1575-82 (1994).
Kim et al. Inhibitory Effects of Bile Acides and Synthetic Farnesoid X Receptor Agonists on Rotavirus Replication. J Virol 85(23):12570-12577 (2011).
Kumar et al. Colon targeted drug delivery systems—an overview. Curr Drug Deliv 5(3):186-198 (2008).
Lam et al. Bile acids inhibit duodenal secretin expression via orphan nuclear receptor small heterodimer partner (SHP). Am J Physiol Gastrointest Liver Physiol 287:G90-G97 (2009).
Li et al. Microbiome remodelling leads to inhibition of intestinal farnesoid X receptor signalling and decreased obesity. Nat Commun 4:2384 (2013).
Li et al. Progress in the ligands and their complex structures of farnesoid X receptor. ACTA Pharmaceutica Sinica 47(6):704-715 (2012) (English Abstract).
Ling et al., Preparation of 3-(benzoylamino)propionic acid derivatives as glucagon antagonists/inverse agonists. Chemical Abstracts Service. XP002791365. Database accession No. 2000:824211 (2000).
Merk et al. Medicinal chemistry of farnesoid X receptor ligands: from agonists and antagonists to modulators. Future Med Chem 4(8):1015-1036 (2012).
Misawa et al. Discovery and structural development of small molecules that enhance transport activity of bile salt export pump mutant associated with progressive familial intrahepatic cholestasis type 2. Bioorg Med Chem 20:2940-2949 (2012).
Mokale et al. Synthesis and in-vivo hypolipidemic activity of some novel substituted phenyl isoxazol phenoxy acetic acid derivatives. Bioorg Med Chem Lett 24(9):2155-2158 (2014).
Mueller et al. Synthesis of plasmepsin II inhibitors—potential antimalarial agents. Molecules 8(7):556-564 (2003).
Mueller et al., Synthesis of plasmepsin II inhibitors as potential antimalarial agents. Chemical Abstracts Service. Database accession No. 2003:524478 (2003).
Nicolaou et al. Discovery and optimization of non-steroidal FXR agonists from natural product-like libraries. Org Biomol Chem 1:908-920 (2003).
O'Keefe et al., Preparation of amide and sulfonamidel igands for the estrogen receptor. Chemical Abstracts Service. Database accession No. 2004:267292 (2004).
Patel et al. Therapeutic opportunities in colon-specific drug-delivery systems. Crit Rev Ther Drug Carrier Syst. 24(2):147-202 (2007).
PCT/US2019/051603 International Search Report and Written Opinion dated Dec. 4, 2019.
PCT/US2021/022786 International Search Report and Written Opinion dated Jun. 15, 2021.
PCT/US2021/022790 International Search Report and Written Opinion dated Jun. 15, 2021.
PCT/US2021/022793 International Search Report and Written Opinion dated Jul. 16, 2021.
Poondra et al., Discovery of Indoline-Based, Natural-Product-like Compounds as Probes of Focal Adhesion Kinase Signaling Pathways. Chemical Abstracts Service. Database accession No. 2009:61531 (2009).
Poondra et al. Discovery of Indoline-Based, Natural-Product-like Compounds as Probes of Focal Adhesion Kinase Signaling Pathways. J Comb Chem 11(2):303-309 (2009).
Price. The computational prediction of pharmaceutical crystal structures and polymorphism. Advanced Drug Delivery Reviews 56:301-319 (2004).
Ramanathan et al. One-Pot Reactions for Synthesis of 2,5-Substituted Tetrazoles from Aryldiazonium Salts and Amidines. Organic Letters 17(23):5886-5889 (2015).
Reschly et al. Ligand specificity and evolution of liver X receptors. J Steroid Biochem Mol Biol 110(1-2):83-94 (2008).
Sanyal et al. Involvement of corepressor complex subunit GPS2 in transcriptional pathways governing human bile acid biosynthesis. PNAS USA 104(40):15665-15670 (2007).
Schuster et al. Pharmacophore-based discovery of FXR agonists. Part I: Model development and experimental validation. Bioorg Med Chem 19:7168-7180 (2011).
Science IP—The CAS Search Service. Jul. 17, 2015 (316 pgs).

(56) References Cited

OTHER PUBLICATIONS

Shen et al. Synthesis and structure-activity relationships of thiadiazole-derivatives as potent and orally active peroxisome proliferator-activated receptors alpha/delta dual agonists. Bioorg Med Chem 16(6):3321-3341 (2008).

Steri et al. Antidiabetic sulfonylureas modulate farnesoid X receptor activation and target gene transcription. Future Med Chem 2(4):575-589 (2010).

Stojancevic et al. The impact of farnesoid X receptor activation on intestinal permeability in inflammatory bowel disease. Can J Gastroenterol 26(9):631-637 (2012).

Vallin et al. Efficient Chemoenzymatic Dynamic Kinetic Resolution of 1-Heteroaryl Ethanols. J Org Chem 74(24):9328-9336 (2009).

Van Den Mooter. Colon drug delivery. Expert Opin Drug Deliv. 3(1):111-125 (2006).

Wang et al. Farnesoid X receptor antagonizes nuclear factor kappaB in hepatic inflammatory response. Hepatology 48(5):1632-1643 (2008).

Widder et al. Section III: Prodrugs Kinetics. Method in Enzymology. 112:309-396 (1985).

Yang et al. Syntheses of nicotinamide riboside and derivatives: effective agents for increasing nicotinamide adenine dinucleotide concentrations in mammalian cells. J. Med. Chem. 50:6458-61 (2007).

Zheng et al., Preparation of substituted piperidines as modulators of chemokine receptor activity. Chemical Abstracts Service. Database accession No. 2008:419604 (2008).

\* cited by examiner

CRYSTALLINE FORMS OF A FARNESOID X RECEPTOR AGONIST

CROSS-REFERENCE

This application claims benefit of U.S. Provisional Patent Application No. 62/991,213, filed on Mar. 18, 2020, which is incorporated herein by reference in its entirety.

FIELD OF THE INVENTION

Described herein are compounds that are farnesoid X receptor agonists, methods of making such compounds, pharmaceutical compositions and medicaments comprising such compounds, and methods of using such compounds in the treatment of conditions, diseases, or disorders associated with farnesoid X receptor activity.

BACKGROUND OF THE INVENTION

Farnesoid X receptor (FXR) is a nuclear receptor highly expressed in the liver, intestine, kidney, adrenal glands, and adipose tissue. FXR regulates a wide variety of target genes involved in the control of bile acid synthesis and transport, lipid metabolism, and glucose homeostasis. FXR agonism is a treatment modality for many metabolic disorders, liver diseases or conditions, inflammatory conditions, gastrointestinal diseases, or cell proliferation diseases.

SUMMARY OF THE INVENTION

Described herein is the farnesoid X receptor agonist, 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, including pharmaceutically acceptable solvates (including hydrates), polymorphs, and amorphous phases, and methods of uses thereof. 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, as well as the pharmaceutically acceptable solvates (including hydrates), polymorphs, and amorphous phases thereof, are used in the manufacture of medicaments for the treatment of diseases or conditions in a mammal that would benefit from treatment with an FXR agonist.

Also described herein are methods for preparing crystalline forms of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate. Further described are pharmaceutical compositions that include the crystalline forms and methods of using the FXR agonist in the treatment of diseases or conditions.

In one embodiment is a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof.

In another embodiment, the crystalline form of claim 1, wherein the 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate is a free base.

In another embodiment described herein, the crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate is Form 1 having at least one of the following properties:
(a) an X-ray powder diffraction (XRPD) pattern substantially the same as shown in FIG. 1;
(b) an X-ray powder diffraction (XRPD) pattern with characteristic peaks at 7.4° 2-Theta, 8.4° 2-Theta, 14.6° 2-Theta, 15.4° 2-Theta, 16.8° 2-Theta, 17.0° 2-Theta, 17.3° 2-Theta, 17.6° 2-Theta, 18.9° 2-Theta, and 19.3° 2-Theta;
(c) a thermo-gravimetric analysis (TGA) substantially similar to the one set forth in FIG. 2;
(d) a DSC thermogram substantially similar to the one set forth in FIG. 3;
(e) a DSC thermogram with an endotherm having an onset at about 213° C.; or
(f) combinations thereof.

In some embodiments, the crystalline form has an X-ray powder diffraction (XRPD) pattern substantially the same as shown in FIG. 1. In some embodiments, the crystalline form has an X-ray powder diffraction (XRPD) pattern with characteristic peaks at 7.4° 2-Theta, 8.4° 2-Theta, 14.6° 2-Theta, 15.4° 2-Theta, 16.8° 2-Theta, 17.0° 2-Theta, 17.3° 2-Theta, 17.6° 2-Theta, 18.9° 2-Theta, and 19.3° 2-Theta. In some embodiments, the crystalline form has a thermo-gravimetric analysis (TGA) substantially similar to the one set forth in FIG. 2. In some embodiments, the crystalline form has a DSC thermogram substantially similar to the one set forth in FIG. 3. In some embodiments, the crystalline form has a DSC thermogram with an endotherm having an onset at about 213° C. In some embodiments, the crystalline form is characterized as having properties (a), (b), (c), (d), and (e). In some embodiments, the crystalline form is obtained from acetonitrile, ethanol, methanol, 2-propanol, ethyl acetate, ethanol/heptane (1:1 v/v), acetone, or acetonitrile/water (1:2 v/v). In some embodiments, the crystalline form is unsolvated. In some embodiments, the crystalline form is anhydrous.

In another embodiment described herein, the crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate is Form 2 having at least one of the following properties:
(a) an X-ray powder diffraction (XRPD) pattern substantially the same as shown in FIG. 4;
(b) an X-ray powder diffraction (XRPD) pattern with characteristic peaks at 8.5° 2-Theta, 12.8° 2-Theta, 13.4° 2-Theta, 16.2° 2-Theta, 17.0° 2-Theta, 18.8° 2-Theta, 19.5° 2-Theta, and 20.5° 2-Theta;
(c) a thermo-gravimetric analysis (TGA) substantially similar to the one set forth in FIG. 5;
(d) a DSC thermogram substantially similar to the one set forth in FIG. 6;
(e) a DSC thermogram with an endotherm having an onset at about 212° C.; or
(f) combinations thereof.

In some embodiments, the crystalline form has an X-ray powder diffraction (XRPD) pattern substantially the same as shown in FIG. 4. In some embodiments, the crystalline form has an X-ray powder diffraction (XRPD) pattern with characteristic peaks at 8.5° 2-Theta, 12.8° 2-Theta, 13.4° 2-Theta, 16.2° 2-Theta, 17.0° 2-Theta, 18.8° 2-Theta, 19.5° 2-Theta, and 20.5° 2-Theta. In some embodiments, the crystalline form has a thermo-gravimetric analysis (TGA) substantially similar to the one set forth in FIG. 5. In some embodiments, the crystalline form has a DSC thermogram substantially similar to the one set forth in FIG. 6. In some embodiments, the crystalline form has a DSC thermogram with an endotherm having an onset at about 212° C. In some embodiments, the crystalline form is characterized as having properties (a), (b), (c), (d), and (e). In some embodiments, the crystalline form is obtained from ethyl acetate/water (97:3 v/v). In some embodiments, the crystalline form is obtained from acetonitrile. In some embodiments, the crystalline form is obtained from acetone. In some embodiments, the crystalline form is unsolvated. In some embodiments, the crystalline form is anhydrous.

In another embodiment described herein, the crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate is Form 3 having at least one of the following properties:
- (a) an X-ray powder diffraction (XRPD) pattern substantially the same as shown in FIG. 7;
- (b) an X-ray powder diffraction (XRPD) pattern with characteristic peaks at 7.5° 2-Theta, 15.1° 2-Theta, 16.6° 2-Theta, 16.9° 2-Theta, 17.2° 2-Theta, 17.5° 2-Theta, and 18.7° 2-Theta;
- (c) a thermo-gravimetric analysis (TGA) substantially similar to the one set forth in FIG. 8;
- (d) a DSC thermogram substantially similar to the one set forth in FIG. 9;
- (e) a DSC thermogram with an endotherm having an onset at about 214° C.; or
- (f) combinations thereof.

In some embodiments, the crystalline form has an X-ray powder diffraction (XRPD) pattern substantially the same as shown in FIG. 7. In some embodiments, the crystalline form has an X-ray powder diffraction (XRPD) pattern with characteristic peaks at 7.5° 2-Theta, 15.1° 2-Theta, 16.6° 2-Theta, 16.9° 2-Theta, 17.2° 2-Theta, 17.5° 2-Theta, and 18.7° 2-Theta. In some embodiments, the crystalline form has a thermo-gravimetric analysis (TGA) substantially similar to the one set forth in FIG. 8. In some embodiments, the crystalline form has a DSC thermogram substantially similar to the one set forth in FIG. 9. In some embodiments, the crystalline form has a DSC thermogram with an endotherm having an onset at about 214° C. In some embodiments, the crystalline form is characterized as having properties (a), (b), (c), (d), and (e). In some embodiments, the crystalline form is obtained from methyl t-butyl ether (TBME). In some embodiments, the crystalline form is unsolvated. In some embodiments, the crystalline form is anhydrous.

In another embodiment described herein, the crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate is Form 4 having at least one of the following properties:
- (a) an X-ray powder diffraction (XRPD) pattern substantially the same as shown in FIG. 10;
- (b) an X-ray powder diffraction (XRPD) pattern with characteristic peaks at 5.4° 2-Theta, 8.9° 2-Theta, 9.9° 2-Theta, 14.8° 2-Theta, 15.9° 2-Theta, 16.2° 2-Theta, 16.8° 2-Theta, 17.5° 2-Theta, 18.5° 2-Theta, and 20.1° 2-Theta;
- (c) a thermo-gravimetric analysis (TGA) substantially similar to the one set forth in FIG. 11;
- (d) a DSC thermogram substantially similar to the one set forth in FIG. 12;
- (e) a DSC thermogram with a first endotherm having an onset at about 164° C. and a second endotherm having an onset at about 209° C.; or
- (f) combinations thereof.

In some embodiments, the crystalline form has an X-ray powder diffraction (XRPD) pattern substantially the same as shown in FIG. 10. In some embodiments, the crystalline form has an X-ray powder diffraction (XRPD) pattern with characteristic peaks at 5.4° 2-Theta, 8.9° 2-Theta, 9.9° 2-Theta, 14.8° 2-Theta, 15.9° 2-Theta, 16.2° 2-Theta, 16.8° 2-Theta, 17.5° 2-Theta, 18.5° 2-Theta, and 20.1° 2-Theta. In some embodiments, the crystalline form has a thermo-gravimetric analysis (TGA) substantially similar to the one set forth in FIG. 11. In some embodiments, the crystalline form has a DSC thermogram substantially similar to the one set forth in FIG. 12. In some embodiments, the crystalline form has a DSC thermogram with an endotherm having an onset at about 214° C. In some embodiments, the crystalline form is characterized as having properties (a), (b), (c), (d), and (e). In some embodiments, the crystalline form is obtained from methyl t-butyl ether (TBME). In some embodiments, the crystalline form is unsolvated. In some embodiments, the crystalline form is anhydrous.

In further embodiments are provided pharmaceutical compositions, which include crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof, and at least one inactive ingredient selected from pharmaceutically acceptable carriers, diluents, and excipients. In some embodiments, the pharmaceutical composition comprises crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

In another embodiment, provided herein is a compound that is 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof, for use in medicine.

In another aspect, provided herein is a method of treating or preventing a liver disease or condition in a mammal, comprising administering to the mammal in need thereof a therapeutically effective amount of a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate as described herein. In some embodiments, the disease or condition is a metabolic condition. In some embodiments, the disease or condition is a liver condition.

In some embodiments, the crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate described herein is administered to the mammal by intravenous administration, subcutaneous administration, oral administration, inhalation, nasal administration, dermal administration, or ophthalmic administration.

In another aspect, described herein is a method of treating or preventing any one of the diseases or conditions described herein comprising administering a therapeutically effective amount of a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate described herein, or a pharmaceutically acceptable salt, or solvate thereof, to a mammal in need thereof.

In another aspect, described herein is a method for the treatment or prevention of a metabolic or liver condition in a mammal comprising administering a therapeutically effective amount of a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate described herein, or a pharmaceutically acceptable salt, or solvate thereof, to the mammal in need thereof. In other embodiments, the metabolic or liver condition is amenable to treatment with a FXR agonist. In some embodiments, the method further comprises administering a second therapeutic agent to the mammal in addition to the crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl) cyclohexyl 3-hydroxyazetidine-trans-1-carboxylate described herein, or a pharmaceutically acceptable salt, or solvate thereof.

In another aspect, described herein is a method of treating or preventing a liver disease or condition in a mammal, comprising administering to the mammal a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof. In some embodiments, the liver disease or condition is an alcoholic or non-alcoholic liver disease. In some embodiments, the liver disease or condition is primary biliary cirrhosis, primary sclerosing cholangitis, cholestasis, nonalcoholic steatohepatitis (NASH), or nonalcoholic fatty liver disease (NAFLD). In some embodiments, the alcoholic liver disease or condition is fatty liver (steatosis), cirrhosis, or alcoholic hepatitis. In some embodiments, the non-alcoholic liver disease or condition is nonalcoholic steatohepatitis (NASH), or nonalcoholic fatty liver disease (NAFLD). In some embodiments, the non-alcoholic liver disease or condition is nonalcoholic steatohepatitis (NASH). In some embodiments, the non-alcoholic liver disease or condition is nonalcoholic steatohepatitis (NASH) and is accompanied by liver fibrosis. In some embodiments, the non-alcoholic liver disease or condition is nonalcoholic steatohepatitis (NASH) without liver fibrosis. In some embodiments, the non-alcoholic liver disease or condition is intrahepatic cholestasis or extrahepatic cholestasis. In some embodiments, the liver disease or condition is steatohepatitis, cholangitis, fatty liver disease, cholestasis, cirrhosis, fibrotic liver disease, liver inflammation, biliary atresia, Alagille syndrome, IFALD (intestinal failure associated liver disease), parental nutrition associated liver disease (PNALD), hepatitis, hepatocellular carcinoma, cholangiocarcinoma, or combinations thereof. In some embodiments, the cholestasis is intrahepatic cholestasis of pregnancy or progressive familial intrahepatic cholestasis (PFIC).

In another aspect, described herein is a method of treating or preventing a liver fibrosis in a mammal, comprising administering to the mammal a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof. In some embodiments, the mammal is diagnosed with hepatitis C virus (HCV), nonalcoholic steatohepatitis (NASH), primary sclerosing cholangitis (PSC), cirrhosis, Wilson's disease, hepatitis B virus (HBV), HIV associated steatohepatitis and cirrhosis, chronic viral hepatitis, non-alcoholic fatty liver disease (NAFLD), alcoholic steatohepatitis (ASH), primary biliary cirrhosis (PBC), or biliary cirrhosis. In some embodiments, the mammal is diagnosed with nonalcoholic steatohepatitis (NASH).

In another aspect, described herein is a method of treating or preventing a liver inflammation in a mammal, comprising administering to the mammal a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof. In some embodiments, the mammal is diagnosed with hepatitis C virus (HCV), nonalcoholic steatohepatitis (NASH), primary sclerosing cholangitis (PSC), cirrhosis, Wilson's disease, hepatitis B virus (HBV), HIV associated steatohepatitis and cirrhosis, chronic viral hepatitis, non-alcoholic fatty liver disease (NAFLD), alcoholic steatohepatitis (ASH), primary biliary cirrhosis (PBC), or biliary cirrhosis. In some embodiments, the mammal is diagnosed with nonalcoholic steatohepatitis (NASH). In some embodiments, the liver inflammation is associated with inflammation in the gastrointestinal tract. In some embodiments, the mammal is diagnosed with inflammatory bowel disease.

In another aspect, described herein is a method of treating or preventing a gastrointestinal disease or condition in a mammal, comprising administering to the mammal a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof. In some embodiments, the gastrointestinal disease or condition is necrotizing enterocolitis, gastritis, ulcerative colitis, Crohn's disease, inflammatory bowel disease, irritable bowel syndrome, gastroenteritis, radiation induced enteritis, pseudomembranous colitis, chemotherapy induced enteritis, gastro-esophageal reflux disease (GERD), peptic ulcer, non-ulcer dyspepsia (NUD), celiac disease, intestinal celiac disease, post-surgical inflammation, gastric carcinogenesis, graft versus host disease or any combination thereof. In some embodiments, the gastrointestinal disease is irritable bowel syndrome (IBS), irritable bowel syndrome with diarrhea (IBS-D), irritable bowel syndrome with constipation (IBS-C), mixed IBS (IBS-M), unsubtyped IBS (IBS-U), or bile acid diarrhea (BAD).

In another aspect, described herein is a method of treating or preventing a disease or condition in a mammal that would benefit from treatment with a FXR agonist, comprising administering to the mammal a crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate, or a pharmaceutically acceptable salt or solvate thereof. In some embodiments, the methods described herein further comprise administering at least one additional therapeutic agent in addition to the crystalline form of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl) cyclohexyl 3-hydroxyazetidine-trans-1-carboxylate, or a pharmaceutically acceptable salt or solvate thereof.

INCORPORATION BY REFERENCE

All publications and patent applications mentioned in this specification are herein incorporated by reference to the extent applicable and relevant.

DETAILED DESCRIPTION OF THE INVENTION

Figure 1:
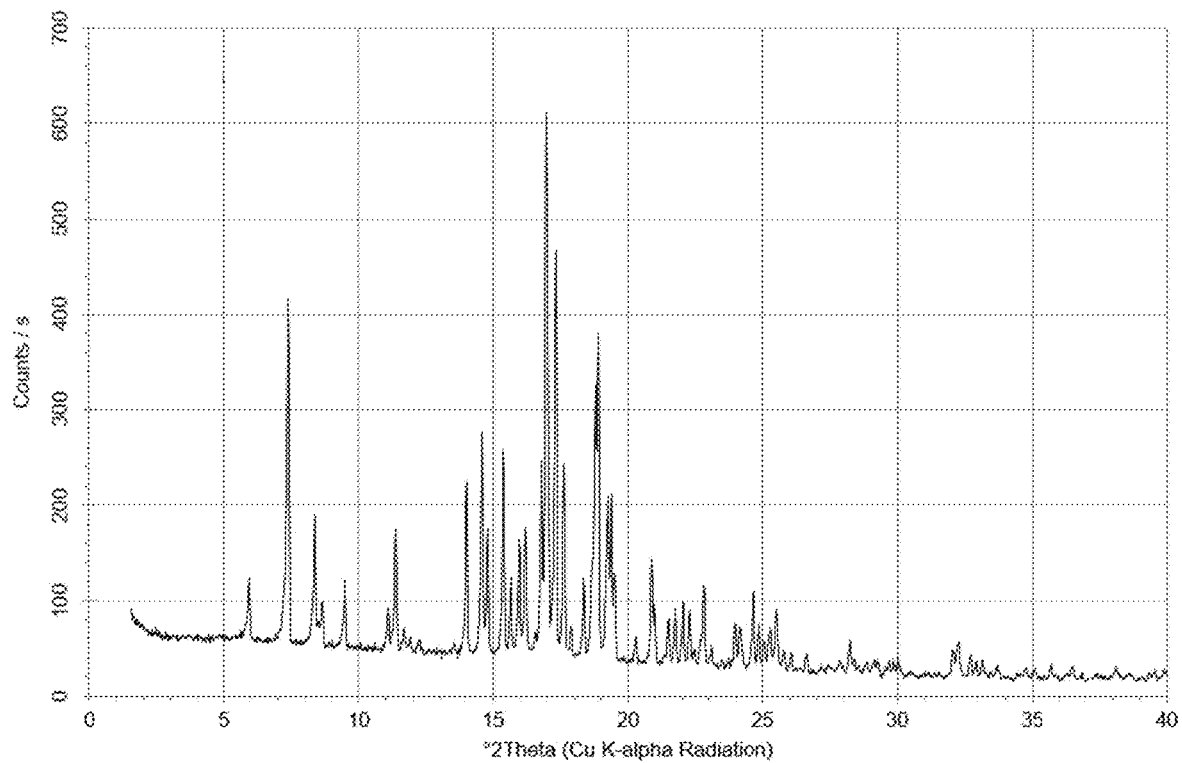
FIG. 1 illustrates an X-ray powder diffraction (XRPD) pattern of Form 1 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

The nuclear hormone receptor farnesoid X receptor (also known as FXR or nuclear receptor subfamily 1, group H, member 4 (NR1H4)) (OMIM: 603826) functions as a regulator for bile acid metabolism. FXR is a ligand-activated transcriptional receptor expressed in diverse tissues including the adrenal gland, kidney, stomach, duodenum, jejunum, ileum, colon, gall bladder, liver, macrophages, and white and brown adipose tissue. FXRs are highly expressed in tissues that participate in bile acid metabolism such as the liver, intestines, and kidneys. Bile acids function as endogenous ligands for FXR such that enteric and systemic release of bile acids induces FXR-directed changes in gene expression networks. Bile acids are the primary oxidation product of cholesterol, and in some cases, upon secretion into the intestines, are regulators of cholesterol absorption. The rate-limiting step for conversion of cholesterol into bile acids is catalyzed by cytochrome p450 enzyme cholesterol 7-α-hydroxylase (CYP7A1) and occurs in the liver. The cytochrome p450 enzyme sterol 12-α-hydroxylase (CYP8B1) mediates production of cholic acid and determines the relative amounts of the two primary bile acids, cholic acid and chenodeoxycholic acid. Activation of FXR can represses the transcription of CYP7A1 and CYP8B1 by increasing the expression level of the hepatic small heterodimer partner (SHP) (also known as nuclear receptor subfamily 0, group B, member 2; or NR0B2) and intestinal expression of fibroblast growth factor 15 (FGF15) in mice and fibroblast growth factor 19 (FGF19) in human. SHP represses the liver receptor homolog (LRH-1) and hepatocyte nuclear factor 4alpha (HNFa4), transcription factors that regulate CYP7A1 and CYP8B1 gene expression. CYP8B1 repression by FXR can be species-specific and FXR activation may in some cases increase CYP8B1 expression in humans (Sanyal et al PNAS, 2007, 104, 15665). In some cases, FGF15/19 released from the intestine then activates the fibroblast growth factor receptor 4 in the liver, leading to activation of the mitogen-activated protein kinase (MAPK) signaling pathway which suppress CYP7A1 and CYP8B1.

In some embodiments, elevated levels of bile acids have been associated with insulin resistance. For example, insulin resistance sometimes leads to a decreased uptake of glucose from the blood and increased de novo glucose production in the liver. In some instances, intestinal sequestration of bile acids has been shown to improve insulin resistance by promoting the secretion of glucagon-like peptide-1 (GLP1) from intestinal L-cells. GLP-1 is an incretin derived from the transcription product of the proglucagon gene. It is released in response to the intake of food and exerts control in appetite and gastrointestinal function and promotes insulin secretion from the pancreas. The biologically active forms of GLP-1 include GLP-1-(7-37) and GLP-1-(7-36)NH$_2$, which result from selective cleavage of the proglucagon molecule. In such cases, activation of FXR leading to decreased production of bile acids correlates to a decrease in insulin resistance.

In some embodiments, the activation of FXR also correlates to the secretion of pancreatic polypeptide-fold such as peptide YY (PYY or PYY3-36). In some instances, peptide YY is a gut hormone peptide that modulates neuronal activity within the hypothalamic and brainstem, regions of the brain involved in reward processing. In some instances, reduced level of PYY correlates to increased appetite and weight gain.

In some instances, the activation of FXR indirectly leads to a reduction of plasma triglycerides. The clearance of triglycerides from the bloodstream is due to lipoprotein lipase (LPL). LPL activity is enhanced by the induction of its activator apolipoprotein CII, and the repression of its inhibitor apolipoprotein CIII in the liver occurs upon FXR activation.

In some cases, the activation of FXR further modulates energy expenditure such as adipocyte differentiation and function. Adipose tissue comprises adipocytes or fat cells. In some instances, adipocytes are further differentiated into brown adipose tissue (BAT) or white adipose tissue (WAT). The function of BAT is to generate body heat, while WAT functions as fat storing tissues.

In some instances, FXR is widely expressed in the intestine. In some cases, the activation of FXR has been shown to induce the expression and secretion of FGF19 (or FGF15 in mouse) in the intestine. FGF19 is a hormone that regulates bile acid synthesis as well as exerts an effect on glucose metabolism, lipid metabolism, and on energy expenditure. In some instances, FGF19 has also been observed to modulate adipocyte function and differentiation. Indeed, a study has shown that the administration of FGF19 to high-fat diet-fed mice increased energy expenditure, modulated adipocytes differentiation and function, reversed weight gain, and improved insulin resistance (see, Fu et al., "Fibroblast growth factor 19 increases metabolic rate and reverses dietary and leptin-deficient diabetes." *Endocrinology* 145: 2594-2603 (2004)).

In some cases, intestinal FXR activity has also been shown to be involved in reducing overgrowth of the microbiome, such as during feeding (Li et al., *Nat Commun* 4:2384, 2013). For example, a study had shown that activation of FXR correlated with increased expression of several genes in the ileum such as Ang2, iNos, and 1118, which have established antimicrobial actions (Inagaki et al., *Proc Natl Acad Sci USA* 103:3920-3925, 2006).

In some cases, FXR has been implicated in barrier function and immune modulation in the intestine. FXR modulates transcription of genes involved in bile salt synthesis, transport and metabolism in the liver and intestine, and in some cases has been shown to lead to improvements in intestinal inflammation and prevention of bacterial translocation into the intestinal tract (Gadaleta et al., *Gut.* 2011 April; 60(4):463-72).

In some cases, over production of bile acids or improper transport and re-cycling of bile acids can lead to diarrhea. FXR modulates transcription of genes involved in bile salt synthesis, transport and metabolism in the liver and intestine, and in some cases may lead to improvements in diarrhea Camilleri, *Gut Liver.* 2015 May; 9(3): 332-339.

G protein-coupled bile acid receptor 1 (also known as GPBAR2, GPCR19, membrane-type receptor for bile acids or M-BAR, or TGR5) is a cell surface receptor for bile acids. Upon activation with bile acid, TGR5 induces the production of intracellular cAMP, which then triggers an increase in triiodothyronine due to the activation of deiodinase (DIO2) in BAT, resulting in increased energy expenditure.

Hence in some embodiments, regulation of metabolic processes such as bile acid synthesis, bile-acid circulation, glucose metabolism, lipid metabolism, or insulin sensitivity is modulated by the activation of FXR. Furthermore, in some embodiments, dis-regulation of metabolic processes such as bile acid synthesis, bile-acid circulation, glucose metabolism, lipid metabolism, or insulin sensitivity results in metabolic diseases such as diabetes or diabetes-related conditions or disorders, alcoholic or non-alcoholic liver disease or condition, intestinal inflammation, or cell proliferative disorders.

Disclosed herein, in certain embodiments, are compounds that have activity as FXR agonists. In some embodiments, the FXR agonists described herein are structurally distinct from bile acids, other synthetic FXR ligands, and other natural FXR ligands.

In some embodiments, also disclosed herein are methods of treating or preventing a metabolic disorder, such as diabetes, obesity, impaired glucose tolerance, dyslipidemia, or insulin resistance by administering a therapeutically effective amount of an FXR agonist. In some instances, the compounds are administered to the GI tract of a subject.

In additional embodiments, disclosed herein are methods for treating or preventing alcoholic or non-alcoholic liver disease or conditions (e.g., cholestasis, primary biliary cirrhosis, steatosis, cirrhosis, alcoholic hepatitis, non-alcoholic steatohepatitis (NASH), non-alcoholic fatty liver disease (NAFLD), primary sclerosing cholangitis (PSC) or elevated liver enzymes) by administering a therapeutically effective amount of an FXR agonist to a subject in need thereof (e.g., via the GI tract). In additional embodiments, disclosed herein include methods for treating or preventing cholestasis, cirrhosis, primary biliary cirrhosis, non-alcoholic steatohepatitis (NASH), non-alcoholic fatty liver disease (NAFLD), or primary sclerosing cholangitis (PSC) by administering a therapeutically effective amount of an FXR agonist to a subject in need thereof. In some embodiments, disclosed herein include methods for treating or preventing cholestasis by administering a therapeutically effective amount of an FXR agonist to a subject in need thereof. In some embodiments, disclosed herein include methods for treating or preventing primary biliary cirrhosis by administering a therapeutically effective amount of an FXR agonist to a subject in need thereof. In some embodiments, disclosed herein include methods for treating or preventing NASH by administering a therapeutically effective amount of an FXR agonist to a subject in need thereof. In some embodiments, disclosed herein include methods for treating or preventing NAFLD by administering a therapeutically effective amount of an FXR agonist to a subject in need thereof.

In further embodiments, disclosed herein include methods for treating or preventing inflammation in the intestines and/or a cell proliferative disorder, such as cancer, by administering a therapeutically effective amount of an FXR agonist to a subject in need thereof (e.g., via the GI tract).

In still further embodiments, disclosed herein include FXR agonists that modulate one or more of the proteins or genes associated with a metabolic process such as bile acid synthesis, glucose metabolism, lipid metabolism, or insulin sensitivity, such as for example, increase in the activity of FGF19 (FGF15 in mouse), increase in the secretion of GLP-1, or increase in the secretion of PYY.

4-((4-(1-(tert-Butyl)-1H-pyrazol-4-yl)pyridin-2-yl)
((4-(4-methoxy-3-methylphenyl)bicyclo[2.2.2]octan-
1-yl)methyl)carbamoyl)cyclohexyl 3-hydroxyazeti-
dine-trans-1-carboxylate (Compound 1)

Described herein is the FXR agonist compound, 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1). "Compound 1" or "4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate" refers to the compound with the following structure:

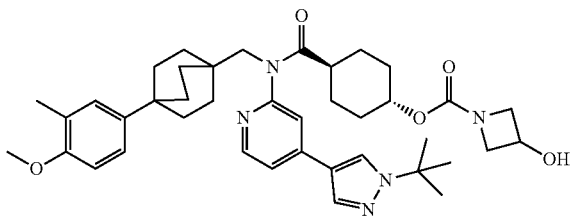 [SMILES: COc1ccc(C23CCC(CN(c4cc(-c5cnn(C(C)(C)C)c5)ccn4)C(=O)[C@H]4CC[C@H](OC(=O)N5CC(O)C5)CC4)(CC2)CC3)cc1C]

In some embodiments, Compound 1 is in the form of pharmaceutically acceptable salt. In some embodiments, Compound 1 is a free base. In addition, Compound 1 can exist in unsolvated as well as solvated forms with pharmaceutically acceptable solvents such as water, ethanol, and the like. The solvated forms of Compound 1 presented herein are also considered to be disclosed herein. In some embodiments, Compound 1 is solvated. In some embodiments, Compound 1 is unsolvated.

"Pharmaceutically acceptable," as used herein, refers a material, such as a carrier or diluent, which does not abrogate the biological activity or properties of the compound, and is relatively nontoxic, i.e., the material is administered to an individual without causing undesirable biological effects or interacting in a deleterious manner with any of the components of the composition in which it is contained.

The term "pharmaceutically acceptable salt" refers to a form of a therapeutically active agent that consists of a cationic form of the therapeutically active agent in combination with a suitable anion, or in alternative embodiments, an anionic form of the therapeutically active agent in combination with a suitable cation. Handbook of Pharmaceutical Salts: Properties, Selection and Use. International Union of Pure and Applied Chemistry, Wiley-VCH 2002. S. M. Berge, L. D. Bighley, D. C. Monkhouse, J. Pharm. Sci. 1977, 66, 1-19. P. H. Stahl and C. G. Wermuth, editors, *Handbook of Pharmaceutical Salts: Properties, Selection and Use*, Weinheim/Zurich: Wiley-VCH/VHCA, 2002. Pharmaceutical salts typically are more soluble and more rapidly soluble in stomach and intestinal juices than non-ionic species and so are useful in solid dosage forms. Furthermore, because their solubility often is a function of pH, selective dissolution in one or another part of the digestive tract is possible, and this capability can be manipulated as one aspect of delayed and sustained release behaviors. Also, because the salt-forming molecule can be in equilibrium with a neutral form, passage through biological membranes can be adjusted.

It should be understood that a reference to a pharmaceutically acceptable salt includes the solvent addition forms. In some embodiments, solvates contain either stoichiometric or non-stoichiometric amounts of a solvent, and are formed during the process of isolating or purifying the compound with pharmaceutically acceptable solvents such as water, ethanol, and the like. Hydrates are formed when the solvent is water, or alcoholates are formed when the solvent is alcohol. Solvates of compounds described herein are conveniently prepared or formed during the processes described herein. In addition, the compounds provided herein optionally exist in unsolvated as well as solvated forms.

Amorphous Compound 1

In some embodiments, Compound 1 is amorphous. In some embodiments, Compound 1 is amorphous and anhydrous. In some embodiments, amorphous Compound 1 has an X-ray powder diffraction (XRPD) pattern showing a lack of crystallinity.

Crystalline Forms of Compound 1

The identification and selection of a solid form of a pharmaceutical compound are complex, given that a change in solid form may affect a variety of physical and chemical properties, which may provide benefits or drawbacks in processing, formulation, stability, bioavailability, storage, handling (e.g., shipping), among other important pharmaceutical characteristics. Useful pharmaceutical solids include crystalline solids and amorphous solids, depending on the product and its mode of administration. Amorphous solids are characterized by a lack of long-range structural order, whereas crystalline solids are characterized by structural periodicity. The desired class of pharmaceutical solid depends upon the specific application; amorphous solids are sometimes selected on the basis of, e.g., an enhanced dissolution profile, while crystalline solids may be desirable for properties such as, e.g., physical or chemical stability.

Whether crystalline or amorphous, solid forms of a pharmaceutical compound include single-component and multiple-component solids. Single-component solids consist essentially of the pharmaceutical compound or active ingredient in the absence of other compounds. Variety among single-component crystalline materials may potentially arise from the phenomenon of polymorphism, wherein multiple three-dimensional arrangements exist for a particular pharmaceutical compound.

Notably, it is not possible to predict apriori if crystalline forms of a compound even exist, let alone how to successfully prepare them (see, e.g., Braga and Grepioni, 2005, "Making crystals from crystals: a green route to crystal engineering and polymorphism," *Chem. Commun.*: 3635-3645 (with respect to crystal engineering, if instructions are not very precise and/or if other external factors affect the process, the result can be unpredictable); Jones et al., 2006, Pharmaceutical Cocrystals: An Emerging Approach to Physical Property Enhancement," *MRS Bulletin* 31:875-879 (At present it is not generally possible to computationally predict the number of observable polymorphs of even the simplest molecules); Price, 2004, "The computational prediction of pharmaceutical crystal structures and polymorphism," *Advanced Drug Delivery Reviews* 56:301-319 ("Price"); and Bernstein, 2004, "Crystal Structure Prediction and Polymorphism," *ACA Transactions* 39:14-23 (a great deal still needs to be learned and done before one can state with any degree of confidence the ability to predict a crystal structure, much less polymorphic forms)).

The variety of possible solid forms creates potential diversity in physical and chemical properties for a given pharmaceutical compound. The discovery and selection of solid forms are of great importance in the development of an effective, stable and marketable pharmaceutical product.

Crystalline Form 1 of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1)

Figure 2:
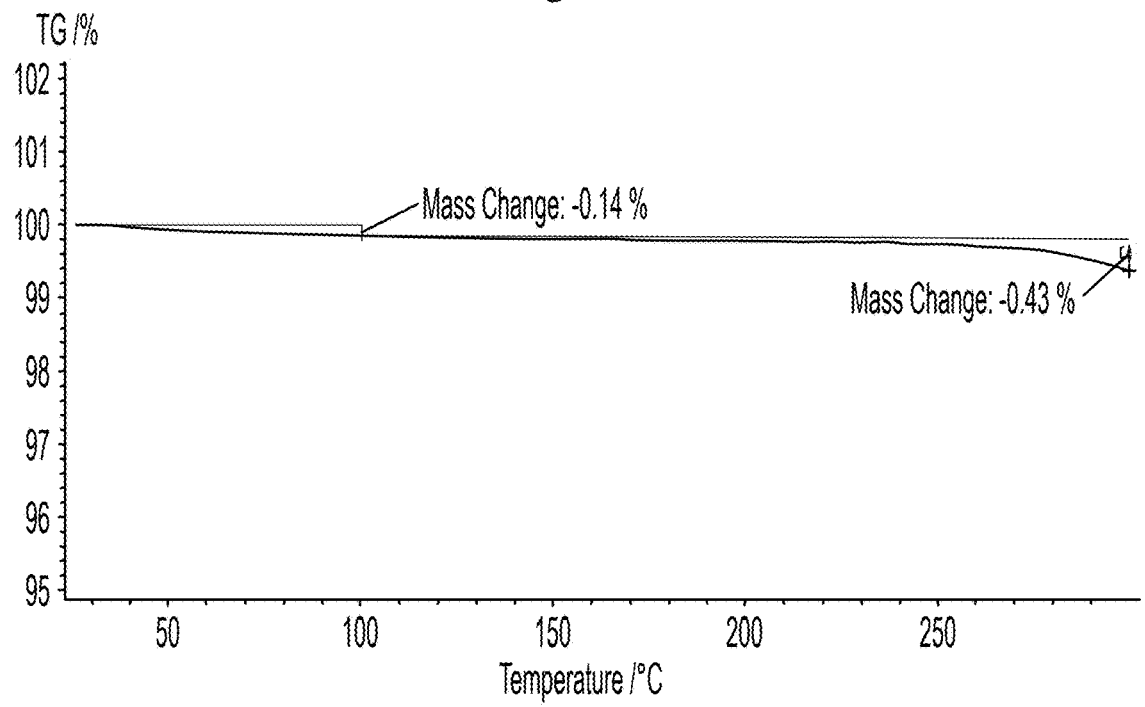
FIG. 2 illustrates a thermo-gravimetric analysis (TGA) thermogram of Form 1 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.
Figure 3:
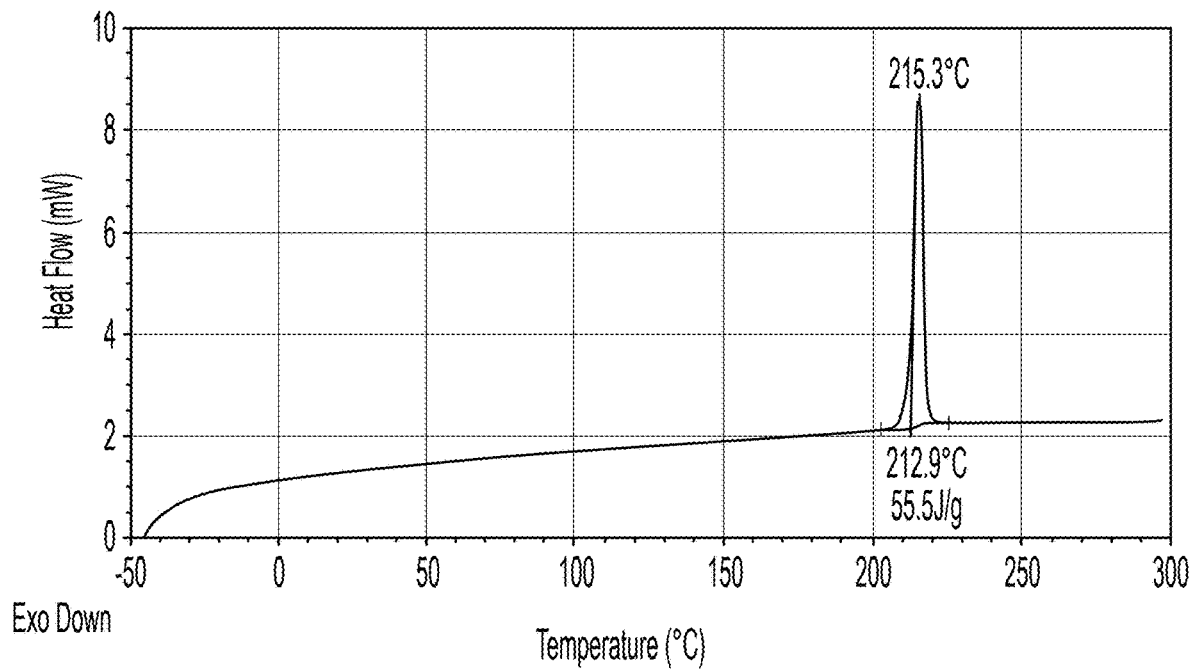
FIG. 3 illustrates a differential scanning calorimetry (DSC) thermogram of Form 1 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

In some embodiments, 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1) is crystalline Form 1. In some embodiments, crystalline Compound 1 is characterized as having at least one of the following properties:
(a) an X-ray powder diffraction (XRPD) pattern substantially the same as shown in FIG. 1;
(b) an X-ray powder diffraction (XRPD) pattern with characteristic peaks at 7.4° 2-Theta, 8.4° 2-Theta, 14.6° 2-Theta, 15.4° 2-Theta, 16.8° 2-Theta, 17.0° 2-Theta, 17.3° 2-Theta, 17.6° 2-Theta, 18.9° 2-Theta, and 19.3° 2-Theta;
(c) a thermo-gravimetric analysis (TGA) substantially similar to the one set forth in FIG. 2;
(d) a DSC thermogram substantially similar to the one set forth in FIG. 3;
(e) a DSC thermogram with an endotherm having an onset at about 213° C.; or
(f) combinations thereof.

In some embodiments, crystalline Compound 1, Form 1, is characterized as having at least two of the properties selected from (a) to (e). In some embodiments, crystalline Compound 1, Form 1, is characterized as having at least three of the properties selected from (a) to (e). In some embodiments, crystalline Compound 1, Form 1, is characterized as having at least four of the properties selected from (a) to (e). In some embodiments, crystalline Compound 1, Form 1, is characterized as having properties (a) to (e).

In some embodiments, crystalline Compound 1, Form 1, has an X-ray powder diffraction (XRPD) pattern substantially the same as shown in FIG. 1. In some embodiments, crystalline Compound 1, Form 1, has an X-ray powder diffraction (XRPD) pattern with characteristic peaks at 7.4° 2-Theta, 8.4° 2-Theta, 14.6° 2-Theta, 15.4° 2-Theta, 16.8° 2-Theta, 17.0° 2-Theta, 17.3° 2-Theta, 17.6° 2-Theta, 18.9° 2-Theta, and 19.3° 2-Theta. In some embodiments, crystalline Compound 1, Form 1, has a thermo-gravimetric analysis (TGA) thermogram substantially similar to the one set forth in FIG. 2. In some embodiments, crystalline Compound 1, Form 1, has a DSC thermogram substantially similar to the one set forth in FIG. 3. In some embodiments, crystalline Compound 1, Form 1, has a DSC thermogram with an endotherm having an onset at about 213° C. In some embodiments, crystalline Compound 1, Form 1, is obtained from acetonitrile, ethanol, methanol, 2-propanol, ethyl acetate, ethanol/heptane (1:1 v/v), acetone, or acetonitrile/water (1:2 v/v). In some embodiments, crystalline Compound 1, Form 1, is obtained from acetonitrile. In some embodiments, crystalline Compound 1, Form 1, is obtained from ethanol. In some embodiments, crystalline Compound 1, Form 1, is obtained from methanol. In some embodiments, crystalline Compound 1, Form 1, is obtained from 2-propanol. In some embodiments, crystalline Compound 1, Form 1, is obtained from ethyl acetate. In some embodiments, crystalline Compound 1, Form 1, is obtained from ethanol/heptane (1:1 v/v). In some embodiments, crystalline Compound 1, Form 1, is obtained from acetone. In some embodiments, crystalline Compound 1, Form 1, is obtained from acetonitrile/water (1:2 v/v). In some embodiments, the crystalline Compound 1, Form 1, is solvated. In some embodiments, crystalline Compound 1, Form 1, is unsolvated. In some embodiments, crystalline Compound 1, Form 1, is hydrated. In some embodiments, crystalline Compound 1, Form 1, is anhydrous.

Crystalline Form 2 of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1)

Figure 4:
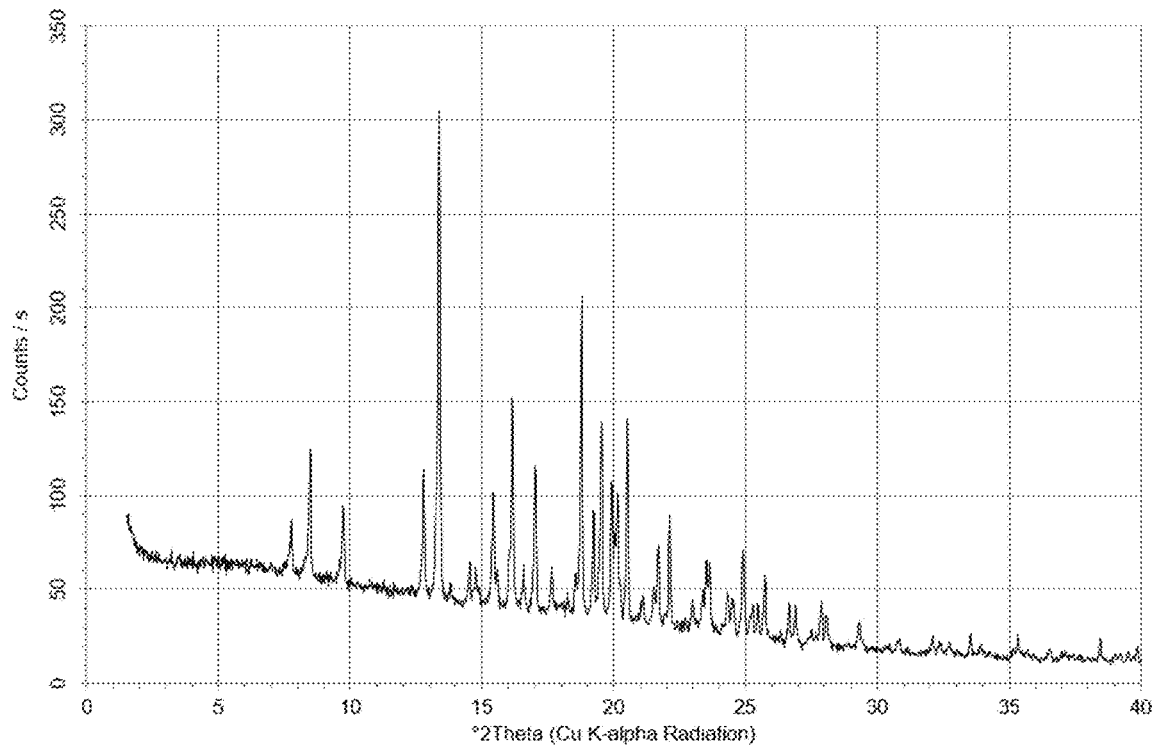
FIG. 4 illustrates an X-ray powder diffraction (XRPD) pattern of Form 2 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.
Figure 5:
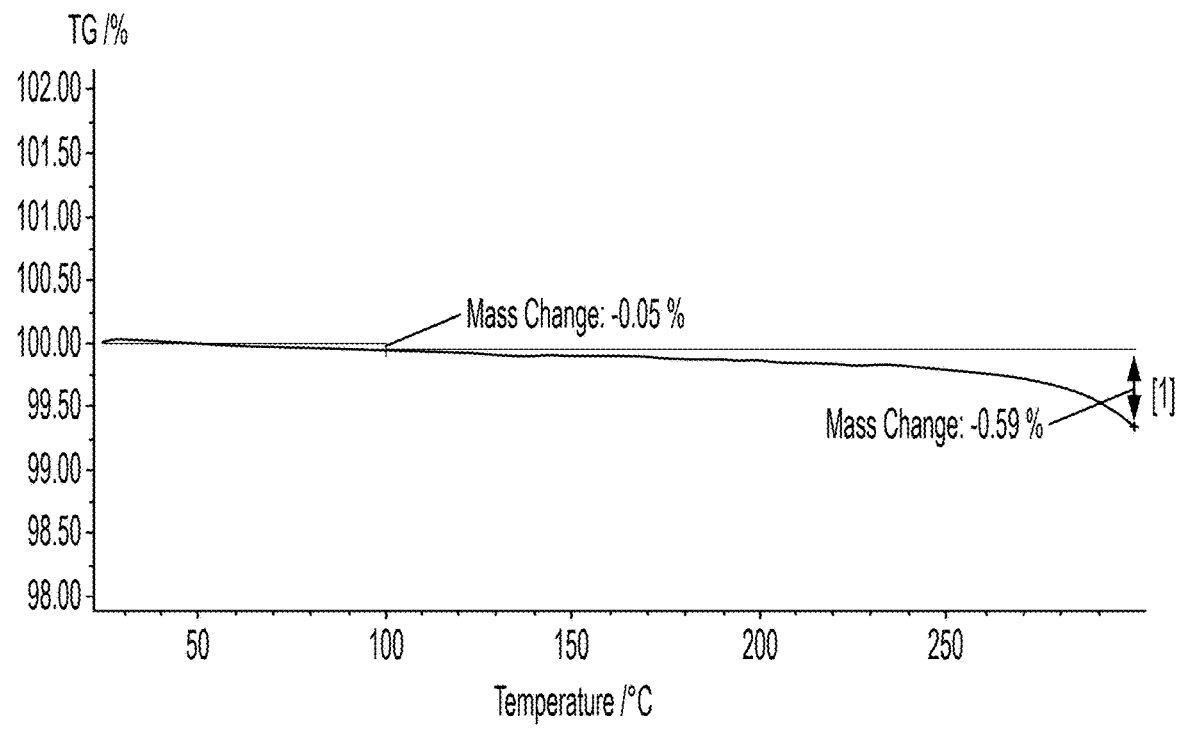
FIG. 5 illustrates a thermo-gravimetric analysis (TGA) thermogram of Form 2 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.
Figure 6:
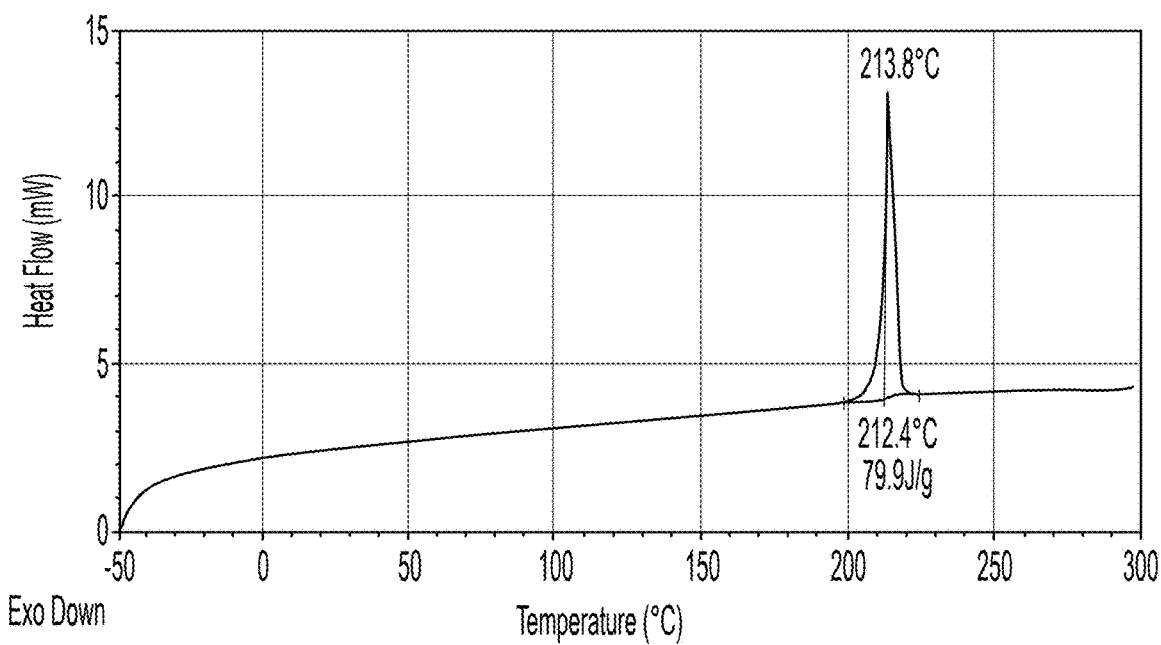
FIG. 6 illustrates a differential scanning calorimetry (DSC) thermogram of Form 2 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

In some embodiments, 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1) is crystalline Form 2. In some embodiments, crystalline Compound 1 is characterized as having at least one of the following properties:
(a) an X-ray powder diffraction (XRPD) pattern substantially the same as shown in FIG. 4;
(b) an X-ray powder diffraction (XRPD) pattern with characteristic peaks at 8.5° 2-Theta, 12.8° 2-Theta, 13.4° 2-Theta, 16.2° 2-Theta, 17.0° 2-Theta, 18.8° 2-Theta, 19.5° 2-Theta, and 20.5° 2-Theta;
(c) a thermo-gravimetric analysis (TGA) substantially similar to the one set forth in FIG. 5;
(d) a DSC thermogram substantially similar to the one set forth in FIG. 6;
(e) a DSC thermogram with an endotherm having an onset at about 212° C.; or
(f) combinations thereof.

In some embodiments, crystalline Compound 1, Form 2, is characterized as having at least two of the properties selected from (a) to (e). In some embodiments, crystalline Compound 1, Form 2, is characterized as having at least three of the properties selected from (a) to (e). In some embodiments, crystalline Compound 1, Form 2, is characterized as having at least four of the properties selected from (a) to (e). In some embodiments, crystalline Compound 1, Form 2, is characterized as having properties (a) to (e).

In some embodiments, crystalline Compound 1, Form 2, has an X-ray powder diffraction (XRPD) pattern substantially the same as shown in FIG. 4. In some embodiments, crystalline Compound 1, Form 2, has an X-ray powder diffraction (XRPD) pattern with characteristic peaks at 8.5° 2-Theta, 12.8° 2-Theta, 13.4° 2-Theta, 16.2° 2-Theta, 17.0° 2-Theta, 18.8° 2-Theta, 19.5° 2-Theta, and 20.5° 2-Theta. In some embodiments, crystalline Compound 1, Form 2, has a thermo-gravimetric analysis (TGA) thermogram substantially similar to the one set forth in FIG. 5. In some embodiments, crystalline Compound 1, Form 2, has a DSC thermogram substantially similar to the one set forth in FIG. 6. In some embodiments, crystalline Compound 1, Form 2, has a DSC thermogram with an endotherm having an onset at about 212° C. In some embodiments, crystalline Compound 1, Form 2, is obtained from ethyl acetate/water (97:3 v/v). In some embodiments, crystalline Compound 1, Form 2, is obtained from acetonitrile. In some embodiments, crystalline Compound 1, Form 2, is obtained from acetone. In some embodiments, the crystalline Compound 1, Form 2, is solvated. In some embodiments, crystalline Compound 1, Form 2, is unsolvated. In some embodiments, crystalline Compound 1, Form 2, is hydrated. In some embodiments, crystalline Compound 1, Form 2, is anhydrous.

Crystalline Form 3 of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1)

Figure 7:
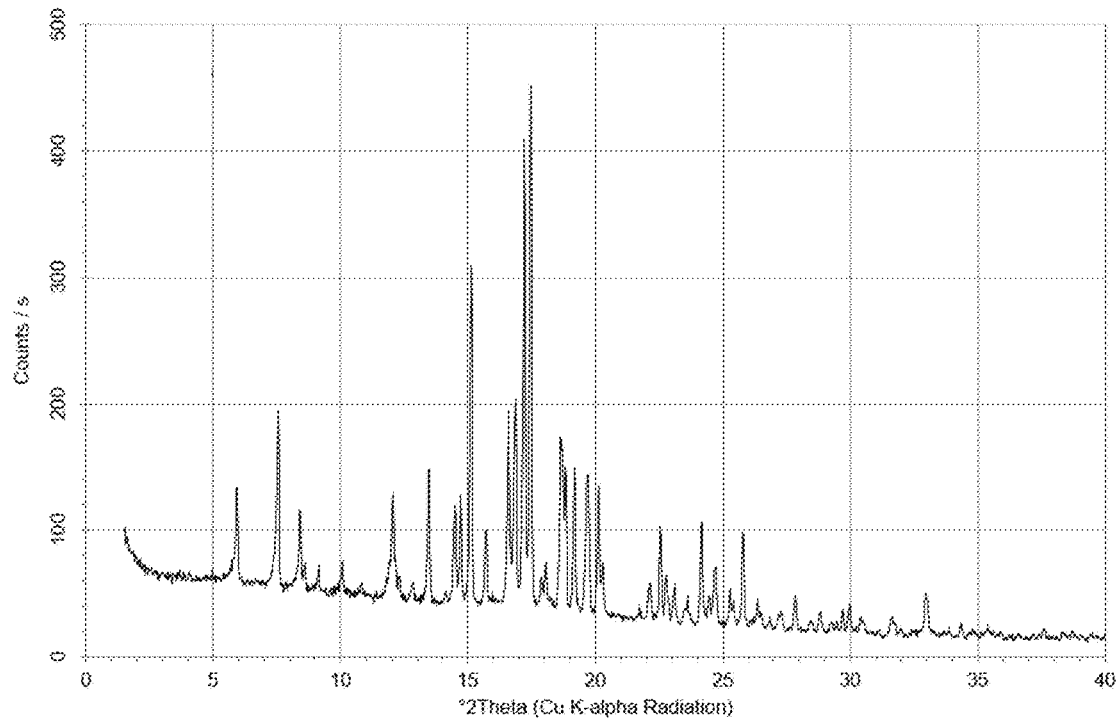
FIG. 7 illustrates an X-ray powder diffraction (XRPD) pattern of Form 3 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.
Figure 8:
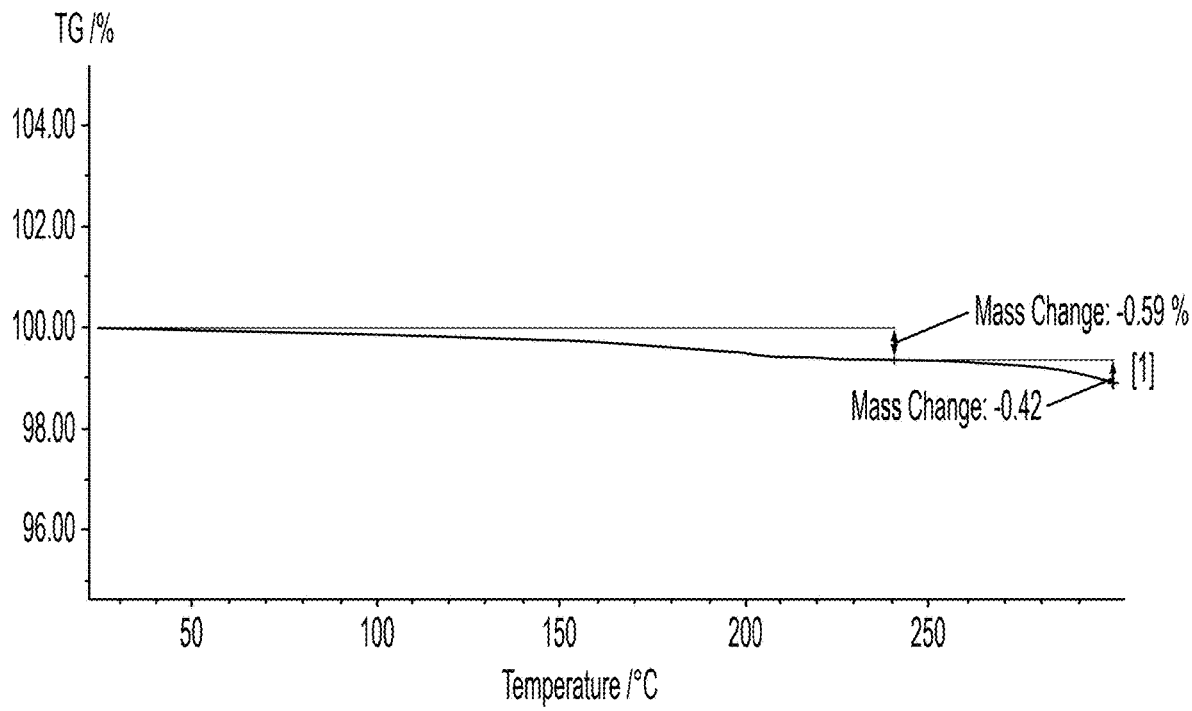
FIG. 8 illustrates a thermo-gravimetric analysis (TGA) thermogram of Form 3 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.
Figure 9:
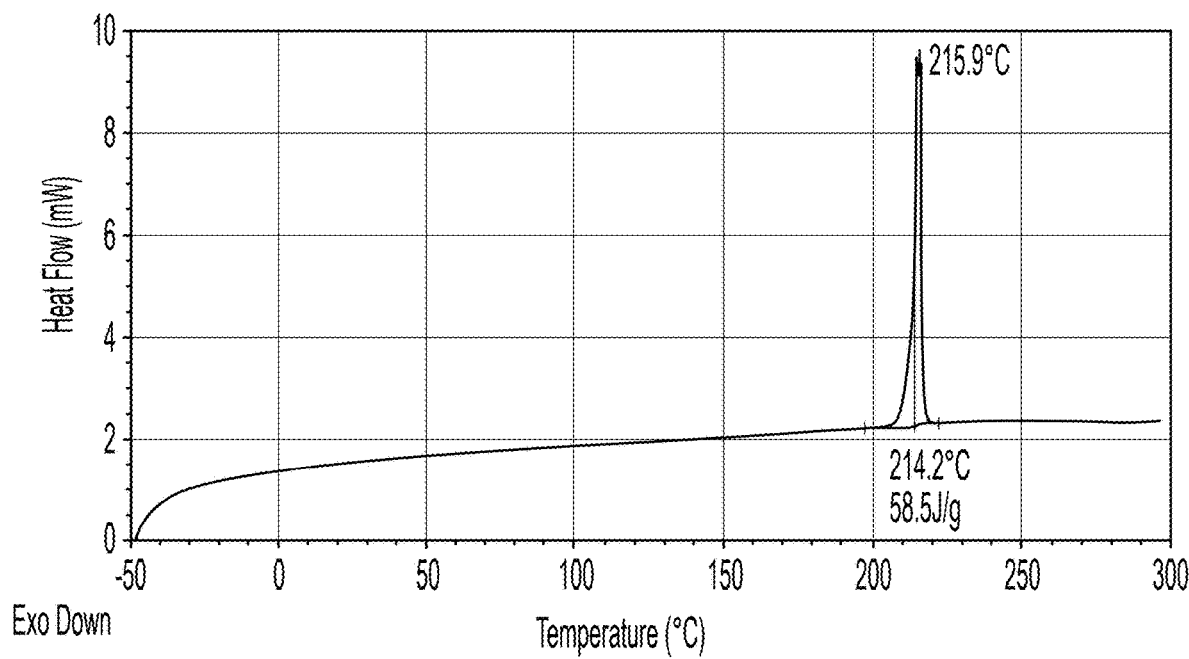
FIG. 9 illustrates a differential scanning calorimetry (DSC) thermogram of Form 3 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

In some embodiments, 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1) is crystalline Form 3. In some embodiments, crystalline Compound 1 is characterized as having at least one of the following properties:
(a) an X-ray powder diffraction (XRPD) pattern substantially the same as shown in FIG. 7;
(b) an X-ray powder diffraction (XRPD) pattern with characteristic peaks at 7.5° 2-Theta, 15.1° 2-Theta, 16.6° 2-Theta, 16.9° 2-Theta, 17.2° 2-Theta, 17.5° 2-Theta, and 18.7° 2-Theta;
(c) a thermo-gravimetric analysis (TGA) substantially similar to the one set forth in FIG. 8;
(d) a DSC thermogram substantially similar to the one set forth in FIG. 9;
(e) a DSC thermogram with an endotherm having an onset at about 214° C.; or
(f) combinations thereof.

In some embodiments, crystalline Compound 1, Form 3, is characterized as having at least two of the properties selected from (a) to (e). In some embodiments, crystalline Compound 1, Form 3, is characterized as having at least three of the properties selected from (a) to (e). In some embodiments, crystalline Compound 1, Form 3, is characterized as having at least four of the properties selected from (a) to (e). In some embodiments, crystalline Compound 1, Form 3, is characterized as having properties (a) to (e).

In some embodiments, crystalline Compound 1, Form 3, has an X-ray powder diffraction (XRPD) pattern substantially the same as shown in FIG. 7. In some embodiments, crystalline Compound 1, Form 3, has an X-ray powder diffraction (XRPD) pattern with characteristic peaks at 7.5° 2-Theta, 15.1° 2-Theta, 16.6° 2-Theta, 16.9° 2-Theta, 17.2° 2-Theta, 17.5° 2-Theta, and 18.7° 2-Theta. In some embodiments, crystalline Compound 1, Form 3, has a thermo-gravimetric analysis (TGA) thermogram substantially similar to the one set forth in FIG. 8. In some embodiments, crystalline Compound 1, Form 3, has a DSC thermogram substantially similar to the one set forth in FIG. 9. In some embodiments, crystalline Compound 1, Form 3, has a DSC thermogram with an endotherm having an onset at about 214° C. In some embodiments, crystalline Compound 1, Form 3, is obtained from methyl t-butyl ether (TBME). In some embodiments, the crystalline Compound 1, Form 3, is solvated. In some embodiments, crystalline Compound 1, Form 3, is unsolvated. In some embodiments, crystalline Compound 1, Form 3, is hydrated. In some embodiments, crystalline Compound 1, Form 3, is anhydrous.

Crystalline Form 4 of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1)

Figure 10:
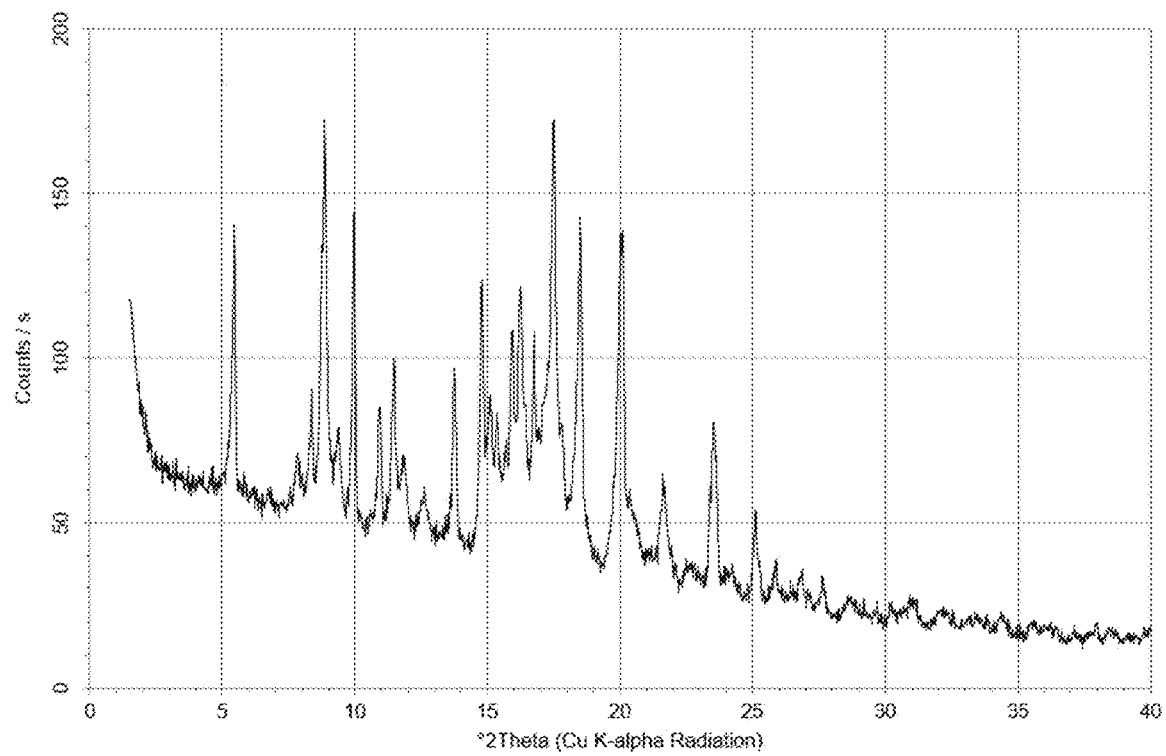
FIG. 10 illustrates an X-ray powder diffraction (XRPD) pattern of Form 4 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.
Figure 11:
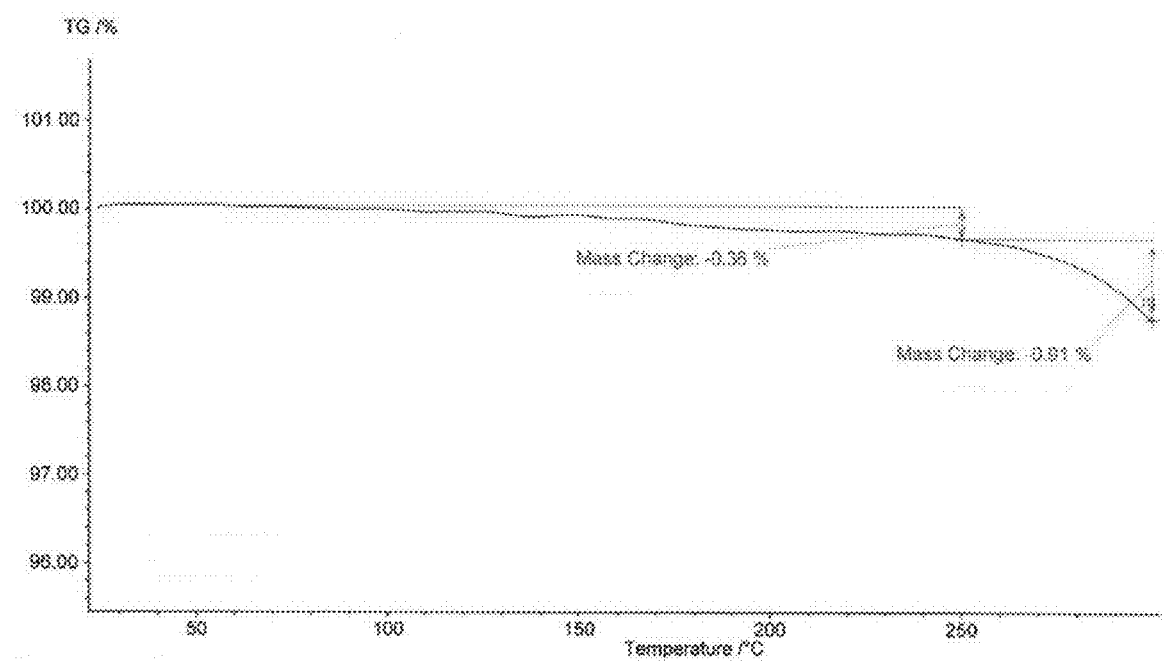
FIG. 11 illustrates a thermo-gravimetric analysis (TGA) thermogram of Form 4 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.
Figure 12:
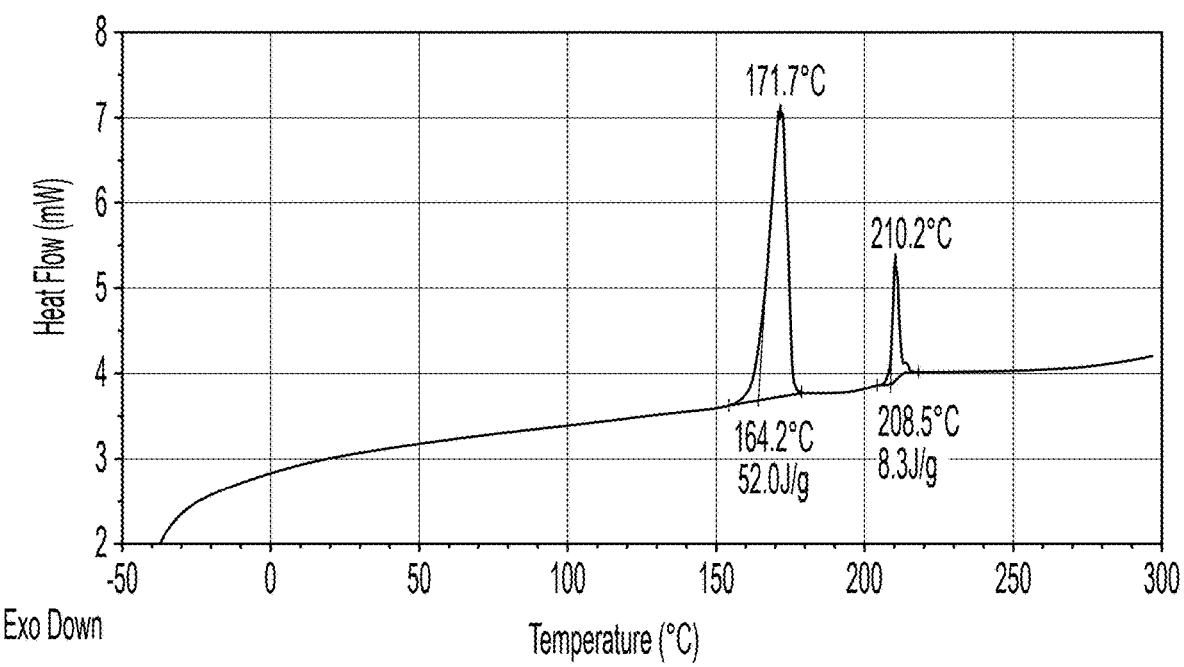
FIG. 12 illustrates a differential scanning calorimetry (DSC) thermogram of Form 4 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

In some embodiments, 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1) is crystalline Form 4. In some embodiments, crystalline Compound 1 is characterized as having at least one of the following properties:
(a) an X-ray powder diffraction (XRPD) pattern substantially the same as shown in FIG. 10;
(b) an X-ray powder diffraction (XRPD) pattern with characteristic peaks at 5.4° 2-Theta, 8.9° 2-Theta, 9.9° 2-Theta, 14.8° 2-Theta, 15.9° 2-Theta, 16.2° 2-Theta, 16.8° 2-Theta, 17.5° 2-Theta, 18.5° 2-Theta, and 20.1° 2-Theta;
(c) a thermo-gravimetric analysis (TGA) substantially similar to the one set forth in FIG. 11;
(d) a DSC thermogram substantially similar to the one set forth in FIG. 12;
(e) a DSC thermogram with a first endotherm having an onset at about 164° C. and a second endotherm having an onset at about 209° C.; or
(f) combinations thereof.

In some embodiments, crystalline Compound 1, Form 4, is characterized as having at least two of the properties selected from (a) to (e). In some embodiments, crystalline Compound 1, Form 4, is characterized as having at least three of the properties selected from (a) to (e). In some embodiments, crystalline Compound 1, Form 4, is characterized as having at least four of the properties selected from (a) to (e). In some embodiments, crystalline Compound 1, Form 4, is characterized as having properties (a) to (e).

In some embodiments, crystalline Compound 1, Form 4, has an X-ray powder diffraction (XRPD) pattern substantially the same as shown in FIG. 7. In some embodiments, crystalline Compound 1, Form 4, has an X-ray powder diffraction (XRPD) pattern with characteristic peaks at 5.4° 2-Theta, 8.9° 2-Theta, 9.9° 2-Theta, 14.8° 2-Theta, 15.9° 2-Theta, 16.2° 2-Theta, 16.8° 2-Theta, 17.5° 2-Theta, 18.5° 2-Theta, and 20.1° 2-Theta. In some embodiments, crystalline Compound 1, Form 4, has a thermo-gravimetric analysis (TGA) thermogram substantially similar to the one set forth in FIG. 8. In some embodiments, crystalline Compound 1, Form 4, has a DSC thermogram substantially similar to the one set forth in FIG. 9. In some embodiments, crystalline Compound 1, Form 4, has a DSC thermogram with a first endotherm having an onset at about 164° C. and a second endotherm having an onset at about 209° C. In some embodiments, the crystalline Compound 1, Form 4, is solvated. In some embodiments, crystalline Compound 1, Form 4, is unsolvated. In some embodiments, crystalline Compound 1, Form 4, is hydrated. In some embodiments, crystalline Compound 1, Form 4, is anhydrous.

Preparation of Crystalline Forms

In some embodiments, crystalline forms of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1) are prepared as outlined in the Examples. It is noted that solvents, temperatures and other reaction and drying conditions presented herein may vary.

In another embodiment, crystalline Compound 1 is substantially pure. In certain embodiments, the substantially pure crystalline Compound 1 is substantially free of amorphous Compound 1 and other crystalline forms. In certain embodiments, the purity of the substantially pure crystalline form of Compound 1 is no less than about 95%, no less than about 96%, no less than about 97%, no less than about 98%, no less than about 98.5%, no less than about 99%, no less than about 99.5%, or no less than about 99.8%.

Compound 1 Co-Crystals

Co-crystals are crystalline molecular complexes of two or more non-volatile compounds bound together in a crystal lattice by non-ionic interactions. Pharmaceutical co-crystals are co-crystals of a therapeutic compound, e.g., Compound 1, and one or more non-volatile compound(s). The one or more non-volatile compound in a pharmaceutical cocrystal is typically selected from non-toxic pharmaceutically acceptable molecules, such as, for example, food additives, preservatives, pharmaceutical excipients, or other APIs. In some embodiments, provided herein is a co-crystal comprising Compound 1, or a pharmaceutically acceptable salt or solvate thereof, and at least one inactive ingredient selected from pharmaceutically acceptable carriers, diluents, and excipients. In some embodiments, co-crystals are prepared using solid-state methods such as solid-state grinding and solvent-drop grinding. In some embodiments, co-crystals are prepared using high-throughput screening. In some embodiments, co-crystals are prepared using solution-based crystallization. In some embodiments, co-crystals formation leads to enhancement of physical properties of the resulting solid forms, such as solubility, dissolution rate, bioavailability, physical stability, chemical stability, flowability, fractability, or compressibility. In some embodiments, Compound 1 forms different co-crystals with different counter-molecules, and some of these co-crystals exhibit enhanced solubility or stability. In some embodiments pharmaceutical co-crystals of Compound 1 increase the bioavailability or stability profile of Compound 1.

Suitable Solvents

Therapeutic agents that are administrable to mammals, such as humans, must be prepared by following regulatory guidelines. Such government regulated guidelines are referred to as Good Manufacturing Practice (GMP). GMP guidelines outline acceptable contamination levels of active therapeutic agents, such as, for example, the amount of residual solvent in the final product. Preferred solvents are those that are suitable for use in GMP facilities and consistent with industrial safety concerns. Categories of solvents are defined in, for example, the International Conference on Harmonization of Technical Requirements for Registration of Pharmaceuticals for Human Use (ICH), "Impurities: Guidelines for Residual Solvents, Q3C(R3), (November 2005).

Solvents are categorized into three classes. Class 1 solvents are toxic and are to be avoided. Class 2 solvents are solvents to be limited in use during the manufacture of the therapeutic agent. Class 3 solvents are solvents with low toxic potential and of lower risk to human health. Data for Class 3 solvents indicate that they are less toxic in acute or short-term studies and negative in genotoxicity studies.

Class 1 solvents, which are to be avoided, include: benzene; carbon tetrachloride; 1,2-dichloroethane; 1,1-dichloroethene; and 1,1,1-trichloroethane.

Examples of Class 2 solvents are: acetonitrile, chlorobenzene, chloroform, cyclohexane, 1,2-dichloroethene, dichloromethane, 1,2-dimethoxyethane, N,N-dimethylacetamide, N,N-dimethylformamide, 1,4-dioxane, 2-ethoxyethanol, ethyleneglycol, formamide, hexane, methanol, 2-methoxyethanol, methylbutyl ketone, methylcyclohexane, N-methylpyrrolidine, nitromethane, pyridine, sulfolane, tetralin, toluene, 1,1,2-trichloroethene and xylene.

Class 3 solvents, which possess low toxicity, include: acetic acid, acetone, anisole, 1-butanol, 2-butanol, butyl acetate, methyl t-butyl ether (MTBE), cumene, dimethyl sulfoxide, ethanol, ethyl acetate, ethyl ether, ethyl formate, formic acid, heptane, isobutyl acetate, isopropyl acetate, methyl acetate, 3-methyl-1-butanol, methylethyl ketone, methylisobutyl ketone, 2-methyl-1-propanol, pentane, 1-pentanol, 1-propanol, 2-propanol, propyl acetate, and tetrahydrofuran.

Residual solvents in active pharmaceutical ingredients (APIs) originate from the manufacture of API. In some cases, the solvents are not completely removed by practical manufacturing techniques. Appropriate selection of the solvent for the synthesis of APIs may enhance the yield, or determine characteristics such as crystal form, purity, and solubility. Therefore, the solvent is a critical parameter in the synthetic process.

In some embodiments, compositions comprising Compound 1 comprise an organic solvent(s). In some embodiments, compositions comprising Compound 1 comprise a residual amount of an organic solvent(s). In some embodiments, the organic solvent is a Class 3 solvent. In some embodiments, compositions comprising Compound 1 comprise a residual amount of a Class 3 solvent. In some embodiments, the Class 3 solvent is selected from the group consisting of acetic acid, acetone, anisole, 1-butanol, 2-butanol, butyl acetate, methyl t-butyl ether, cumene, dimethyl sulfoxide, ethanol, ethyl acetate, ethyl ether, ethyl formate, formic acid, heptane, isobutyl acetate, isopropyl acetate, methyl acetate, 3-methyl-1-butanol, methylethyl ketone, methylisobutyl ketone, 2-methyl-1-propanol, pentane, 1-pentanol, 1-propanol, 2-propanol, propyl acetate, and tetrahydrofuran. In some embodiments, the Class 3 solvent is selected from ethyl acetate, isopropyl acetate, tert-butylmethylether, heptane, isopropanol, and ethanol.

Certain Terminology

Unless otherwise stated, the following terms used in this application have the definitions given below. The use of the term "including" as well as other forms, such as "include", "includes," and "included," is not limiting. The section headings used herein are for organizational purposes only and are not to be construed as limiting the subject matter described.

The term "acceptable" with respect to a formulation, composition or ingredient, as used herein, means having no persistent detrimental effect on the general health of the subject being treated.

The term "modulate" as used herein, means to interact with a target either directly or indirectly so as to alter the activity of the target, including, by way of example only, to enhance the activity of the target, to inhibit the activity of the target, to limit the activity of the target, or to extend the activity of the target.

The term "modulator" as used herein, refers to a molecule that interacts with a target either directly or indirectly. The interactions include, but are not limited to, the interactions of an agonist, partial agonist, an inverse agonist, antagonist, degrader, or combinations thereof. In some embodiments, a modulator is an agonist.

The terms "administer," "administering", "administration," and the like, as used herein, refer to the methods that may be used to enable delivery of compounds or compositions to the desired site of biological action. These methods include, but are not limited to oral routes, intraduodenal routes, parenteral injection (including intravenous, subcutaneous, intraperitoneal, intramuscular, intravascular or infusion), topical and rectal administration. Those of skill in the art are familiar with administration techniques that can be employed with the compounds and methods described herein. In some embodiments, the compounds and compositions described herein are administered orally.

The terms "co-administration" or the like, as used herein, are meant to encompass administration of the selected therapeutic agents to a single patient, and are intended to include treatment regimens in which the agents are administered by the same or different route of administration or at the same or different time.

The terms "effective amount" or "therapeutically effective amount," as used herein, refer to a sufficient amount of an agent or a compound being administered, which will relieve to some extent one or more of the symptoms of the disease or condition being treated. The result includes reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case is optionally determined using techniques, such as a dose escalation study.

The terms "enhance" or "enhancing," as used herein, means to increase or prolong either in potency or duration a desired effect. Thus, in regard to enhancing the effect of therapeutic agents, the term "enhancing" refers to the ability to increase or prolong, either in potency or duration, the effect of other therapeutic agents on a system. An "enhancing-effective amount," as used herein, refers to an amount adequate to enhance the effect of another therapeutic agent in a desired system.

The term "pharmaceutical combination" as used herein, means a product that results from the mixing or combining of more than one active ingredient and includes both fixed and non-fixed combinations of the active ingredients. The term "fixed combination" means that the active ingredients, e.g. Compound 1, or a pharmaceutically acceptable salt thereof, and a co-agent, are both administered to a patient simultaneously in the form of a single entity or dosage. The term "non-fixed combination" means that the active ingredients, e.g. Compound 1, or a pharmaceutically acceptable salt thereof, and a co-agent, are administered to a patient as separate entities either simultaneously, concurrently or sequentially with no specific intervening time limits, wherein such administration provides effective levels of the two compounds in the body of the patient. The latter also applies to cocktail therapy, e.g. the administration of three or more active ingredients.

The terms "kit" and "article of manufacture" are used as synonyms.

The term "subject" or "patient" encompasses mammals. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. In one aspect, the mammal is a human.

The terms "treat," "treating" or "treatment," as used herein, include alleviating, abating or ameliorating at least one symptom of a disease or condition, preventing additional symptoms, inhibiting the disease or condition, e.g., arresting the development of the disease or condition, relieving the disease or condition, causing regression of the disease or condition, relieving a condition caused by the disease or condition, or stopping the symptoms of the disease or condition either prophylactically and/or therapeutically.

Pharmaceutical Compositions

In some embodiments, Compound 1 described herein is formulated into pharmaceutical compositions. Pharmaceutical compositions are formulated in a conventional manner using one or more pharmaceutically acceptable inactive ingredients that facilitate processing of the active compounds into preparations that are used pharmaceutically. Proper formulation is dependent upon the route of administration chosen. A summary of pharmaceutical compositions described herein is found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999), herein incorporated by reference for such disclosure.

In some embodiments, Compound 1 described herein is administered either alone or in combination with pharmaceutically acceptable carriers, excipients or diluents, in a pharmaceutical composition. Administration of Compound 1 described herein, and pharmaceutical compositions thereof, can be affected by any method that enables delivery of the compound to the site of action. These methods include, though are not limited to delivery via enteral routes (including oral, gastric or duodenal feeding tube, rectal suppository and rectal enema), parenteral routes (injection or infusion, including intraarterial, intracardiac, intradermal, intraduodenal, intramedullary, intramuscular, intraosseous, intraperitoneal, intrathecal, intravascular, intravenous, intravitreal, epidural and subcutaneous), inhalational, transdermal, transmucosal, sublingual, buccal and topical (including epicutaneous, dermal, enema, eye drops, ear drops, intranasal, vaginal) administration, although the most suitable route may depend upon for example the condition and disorder of the recipient. By way of example only, Compound 1 can be administered locally to the area in need of treatment, by for example, local infusion during surgery, topical application such as creams or ointments, injection, catheter, or implant. The administration can also be by direct injection at the site of a diseased tissue or organ.

In some embodiments, Compound 1 pharmaceutical compositions suitable for oral administration are presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. In some embodiments, the active ingredient is presented as a bolus, electuary or paste.

Pharmaceutical compositions which can be used orally include tablets, push-fit capsules made of gelatin, as well as soft, sealed capsules made of gelatin and a plasticizer, such as glycerol or sorbitol. Tablets may be made by compression or molding, optionally with one or more accessory ingredients. Compressed tablets may be prepared by compressing in a suitable machine the active ingredient in a free-flowing form such as a powder or granules, optionally mixed with binders, inert diluents, or lubricating, surface active or dispersing agents. Molded tablets may be made by molding in a suitable machine a mixture of the powdered compound moistened with an inert liquid diluent. In some embodiments, the tablets are coated or scored and are formulated so as to provide slow or controlled release of the active ingredient therein. All formulations for oral administration should be in dosages suitable for such administration. The push-fit capsules can contain the active ingredients in admixture with filler such as lactose, binders such as starches, and/or lubricants such as talc or magnesium stearate and, optionally, stabilizers. In soft capsules, the active compounds may be dissolved or suspended in suitable liquids, such as fatty oils, liquid paraffin, or liquid polyethylene glycols. In some embodiments, stabilizers are added. Dragee cores are provided with suitable coatings. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or Dragee coatings for identification or to characterize different combinations of active compound doses.

In some embodiments, pharmaceutical compositions are formulated for parenteral administration by injection, e.g., by bolus injection or continuous infusion. Formulations for injection may be presented in unit dosage form, e.g., in ampoules or in multi-dose containers, with an added preservative. The compositions may take such forms as suspensions, solutions or emulsions in oily or aqueous vehicles, and may contain formulatory agents such as suspending, stabilizing and/or dispersing agents. The compositions may be presented in unit-dose or multi-dose containers, for example sealed ampoules and vials, and may be stored in powder form or in a freeze-dried (lyophilized) condition requiring only the addition of the sterile liquid carrier, for example, saline or sterile pyrogen-free water, immediately prior to use. Extemporaneous injection solutions and suspensions may be prepared from sterile powders, granules and tablets of the kind previously described.

Pharmaceutical compositions for parenteral administration include aqueous and non-aqueous (oily) sterile injection solutions of the active compounds which may contain antioxidants, buffers, bacteriostats and solutes which render the formulation isotonic with the blood of the intended recipient; and aqueous and non-aqueous sterile suspensions which may include suspending agents and thickening agents. Suitable lipophilic solvents or vehicles include fatty oils such as sesame oil, or synthetic fatty acid esters, such as ethyl oleate or triglycerides, or liposomes. Aqueous injection suspensions may contain substances which increase the viscosity of the suspension, such as sodium carboxymethyl cellulose, sorbitol, or dextran. Optionally, the suspension may also contain suitable stabilizers or agents which increase the solubility of the compounds to allow for the preparation of highly concentrated solutions.

For buccal or sublingual administration, the compositions may take the form of tablets, lozenges, pastilles, or gels formulated in conventional manner. Such compositions may comprise the active ingredient in a flavored basis such as sucrose and acacia or tragacanth.

It should be understood that in addition to the ingredients particularly mentioned above, the compositions described herein may include other agents conventional in the art having regard to the type of formulation in question, for example those suitable for oral administration may include flavoring agents.

Methods of Dosing and Treatment Regimens

In one embodiment, Compound 1 described herein, or a pharmaceutically acceptable salt thereof, is used in the preparation of medicaments for the treatment of diseases or conditions in a mammal that would benefit from administration of an FXR agonist. Methods for treating any of the diseases or conditions described herein in a mammal in need of such treatment, involves administration of pharmaceutical compositions that include Compound 1 described herein, or a pharmaceutically acceptable salt, active metabolite, prodrug, or pharmaceutically acceptable solvate thereof, in therapeutically effective amounts to said mammal.

Disclosed herein, are methods of administering a FXR agonist in combination with an additional therapeutic agent. In some embodiments, the additional therapeutic agent comprises a therapeutic agent for treatment of diabetes or diabetes related disorder or conditions, alcoholic or non-alcoholic liver disease, inflammation related intestinal conditions, or cell proliferative disorders.

In certain embodiments, the compositions containing the compound(s) described herein are administered for prophylactic and/or therapeutic treatments. In certain therapeutic applications, the compositions are administered to a patient already suffering from a disease or condition, in an amount sufficient to cure or at least partially arrest at least one of the symptoms of the disease or condition. Amounts effective for this use depend on the severity and course of the disease or condition, previous therapy, the patient's health status, weight, and response to the drugs, and the judgment of the treating physician. Therapeutically effective amounts are optionally determined by methods including, but not limited to, a dose escalation and/or dose ranging clinical trial.

In prophylactic applications, compositions containing the compounds described herein are administered to a patient susceptible to or otherwise at risk of a particular disease, disorder or condition. Such an amount is defined to be a "prophylactically effective amount or dose." In this use, the precise amounts also depend on the patient's state of health, weight, and the like. When used in patients, effective amounts for this use will depend on the severity and course of the disease, disorder or condition, previous therapy, the patient's health status and response to the drugs, and the judgment of the treating physician. In one aspect, prophylactic treatments include administering to a mammal, who previously experienced at least one symptom of the disease being treated and is currently in remission, a pharmaceutical composition comprising a Compound 1, or a pharmaceutically acceptable salt thereof, in order to prevent a return of the symptoms of the disease or condition.

In certain embodiments wherein the patient's condition does not improve, upon the doctor's discretion, the Compound 1 is administered chronically, that is, for an extended period of time, including throughout the duration of the patient's life in order to ameliorate or otherwise control or limit the symptoms of the patient's disease or condition.

In certain embodiments wherein a patient's status does improve, the dose of drug being administered is temporarily reduced or temporarily suspended for a certain length of time (i.e., a "drug holiday"). In specific embodiments, the length of the drug holiday is between 2 days and 1 year, including by way of example only, 2 days, 3 days, 4 days, 5 days, 6 days, 7 days, 10 days, 12 days, 15 days, 20 days, 28 days, or more than 28 days. The dose reduction during a drug holiday is, by way of example only, by 10%-100%, including by way of example only 10%, 15%, 20%, 25%, 30%, 35%, 40%, 45%, 50%, 55%, 60%, 65%, 70%, 75%, 80%, 85%, 90%, 95%, and 100%.

Once improvement of the patient's conditions has occurred, a maintenance dose is administered if necessary. Subsequently, in specific embodiments, the dosage or the frequency of administration, or both, is reduced, as a function of the symptoms, to a level at which the improved disease, disorder or condition is retained. In certain embodiments, however, the patient requires intermittent treatment on a long-term basis upon any recurrence of symptoms.

The amount of a given agent that corresponds to such an amount varies depending upon factors such as the particular compound, disease condition and its severity, the identity (e.g., weight, sex) of the subject or host in need of treatment, but nevertheless is determined according to the particular circumstances surrounding the case, including, e.g., the specific agent being administered, the route of administration, the condition being treated, and the subject or host being treated.

In general, however, doses employed for adult human treatment are typically in the range of 0.01 mg-5000 mg per day. In one aspect, doses employed for adult human treatment are from about 1 mg to about 1000 mg per day. In one embodiment, the desired dose is conveniently presented in a single dose or in divided doses administered simultaneously or at appropriate intervals, for example as two, three, four or more sub-doses per day.

In one embodiment, the daily dosages appropriate for Compound 1 described herein, or a pharmaceutically acceptable salt thereof, are from about 0.01 to about 50 mg/kg per body weight. In some embodiments, the daily dosage or the amount of active in the dosage form are lower or higher than the ranges indicated herein, based on a number of variables in regard to an individual treatment regime. In various embodiments, the daily and unit dosages are altered depending on a number of variables including, but not limited to, the activity of the compound used, the disease or condition to be treated, the mode of administration, the requirements of the individual subject, the severity of the disease or condition being treated, and the judgment of the practitioner.

Toxicity and therapeutic efficacy of such therapeutic regimens are determined by standard pharmaceutical procedures in cell cultures or experimental animals, including, but not limited to, the determination of the $LD_{50}$ and the $ED_{50}$. The dose ratio between the toxic and therapeutic effects is the therapeutic index and it is expressed as the ratio between $LD_{50}$ and $ED_{50}$. In certain embodiments, the data obtained from cell culture assays and animal studies are used in formulating the therapeutically effective daily dosage range and/or the therapeutically effective unit dosage amount for use in mammals, including humans. In some embodiments, the daily dosage amount of the compounds described herein lies within a range of circulating concentrations that include the $ED_{50}$ with minimal toxicity. In certain embodiments, the daily dosage range and/or the unit dosage amount varies within this range depending upon the dosage form employed and the route of administration utilized.

In any of the aforementioned aspects are further embodiments in which the effective amount of Compound 1 described herein, or a pharmaceutically acceptable salt thereof, is: (a) systemically administered to the mammal; and/or (b) administered orally to the mammal; and/or (c) intravenously administered to the mammal; and/or (d) administered by injection to the mammal; and/or (e) administered topically to the mammal; and/or (f) administered non-systemically or locally to the mammal.

In any of the aforementioned aspects are further embodiments comprising single administrations of the effective amount of Compound 1, including further embodiments in which (i) the compound is administered once a day; or (ii) the compound is administered to the mammal multiple times over the span of one day.

In any of the aforementioned aspects are further embodiments comprising multiple administrations of the effective amount of Compound 1, including further embodiments in which (i) the compound is administered continuously or intermittently: as in a single dose; (ii) the time between multiple administrations is every 6 hours; (iii) the compound is administered to the mammal every 8 hours; (iv) the compound is administered to the mammal every 12 hours; (v) the compound is administered to the mammal every 24 hours. In further or alternative embodiments, the method comprises a drug holiday, wherein the administration of the compound is temporarily suspended or the dose of the compound being administered is temporarily reduced; at the end of the drug holiday, dosing of the compound is resumed. In one embodiment, the length of the drug holiday varies from 2 days to 1 year.

In certain instances, it is appropriate to administer Compound 1, or a pharmaceutically acceptable salt thereof, in combination with one or more other therapeutic agents.

In one embodiment, the therapeutic effectiveness of Compound 1 is enhanced by administration of an adjuvant (i.e., by itself the adjuvant has minimal therapeutic benefit, but in combination with another therapeutic agent, the overall therapeutic benefit to the patient is enhanced). Or, in some embodiments, the benefit experienced by a patient is increased by administering one of the compounds described herein with another agent (which also includes a therapeutic regimen) that also has therapeutic benefit.

In one specific embodiment, Compound 1, or a pharmaceutically acceptable salt thereof, is co-administered with a second therapeutic agent, wherein Compound 1, or a pharmaceutically acceptable salt thereof, and the second therapeutic agent modulate different aspects of the disease, disorder or condition being treated, thereby providing a greater overall benefit than administration of either therapeutic agent alone.

EXAMPLES

List of Abbreviations

As used above, and throughout the description of the invention, the following abbreviations, unless otherwise indicated, shall be understood to have the following meanings:

ACN or MeCN acetonitrile
Bn benzyl
BOC or Boc tert-butyl carbamate
t-Bu tert-butyl
Cy cyclohexyl DCE dichloroethane (ClCH$_2$CH$_2$Cl)
DCM dichloromethane (CH$_2$Cl$_2$)
DIPEA or DIEA diisopropylethylamine
DMAP 4-(N,N-dimethylamino)pyridine
DMF dimethylformamide
DMA N,N-dimethylacetamide
DMSO dimethylsulfoxide
equiv equivalent(s)
Et ethyl
Et$_2$O diethyl ether
EtOH ethanol
EtOAc ethyl acetate
HPLC high performance liquid chromatography
Me methyl
MeOH methanol
MS mass spectroscopy
NMR nuclear magnetic resonance
RP-HPLC reverse phase-high pressure liquid chromatography
T3P 2,4,6-tripropyl-1,3,5,2,4,6-trioxatriphosphorinane-2,4,6-trioxide
TBME methyl tert-butyl ether
TFA trifluoroacetic acid
THF tetrahydrofuran
TLC thin layer chromatography I. Chemical Synthesis Unless otherwise noted, reagents and solvents were used as received from commercial suppliers. Anhydrous solvents and oven-dried glassware were used for synthetic transformations sensitive to moisture and/or oxygen. Yields were not optimized. Reaction times are approximate and were not optimized. Column chromatography and thin layer chromatography (TLC) were performed on silica gel unless otherwise noted.

Example 1: Preparation of 4-(4-methoxy-3-methylphenyl)bicyclo[2.2.2]octane-1-carbaldehyde (Intermediate 1)

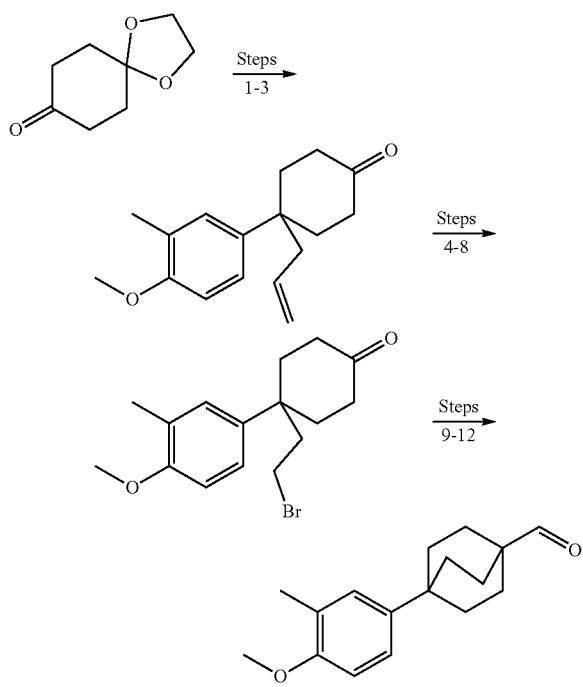

Step 1: 8-(4-Methoxy-3-methylphenyl)-1,4-dioxaspiro[4.5]decan-8-ol 3 batches were run in parallel: n-BuLi (762 mL, 1.90 mol, 2.5 M in n-hexane) was added dropwise over 1 h to a solution of 4-bromo-1-methoxy-2-methylbenzene (333 g, 1.66 mol) and dry THF (2 L) at −60° C. under N$_2$. The reaction was stirred at −60° C. for 1 h, and then a solution of 1,4-dioxaspiro[4.5]decan-8-one (284.53 g, 1.82 mol) and dry THF (1 L) was added dropwise over 45 min. The reaction was stirred at −60° C. for 1 h, and then the 3 batches were poured into sat. aq. NH$_4$Cl (3 L). This mixture was extracted with EtOAc (5 L×2). The combined organic layers were washed with brine (5 L), dried over Na$_2$SO$_4$, filtered, concentrated, and then triturated in n-hexane (1.2 L) at rt overnight. The mixture was filtered, and the filter cake was washed with cool n-hexane (200 mL×2) and then dried under vacuum to give 8-(4-methoxy-3-methylphenyl)-1,4-dioxaspiro[4.5]decan-8-ol (1100 g, 82%) as a white solid. $^1$H NMR (400 MHz, CDCl$_3$): δ 7.30-7.20 (m, 2H), 6.74 (d, 1H), 4.02-3.87 (m, 4H), 3.78 (s, 3H), 2.18 (s, 3H), 2.15-2.00 (m, 4H), 1.82-1.73 (m, 2H), 1.68-1.60 (m, 2H), 1.48 (s, 1H).

Step 2: 8-Allyl-8-(4-methoxy-3-methylphenyl)-1,4-dioxaspiro[4.5]decane 4 batches were run in parallel: BF$_3$·Et$_2$O (376.95 g, 2.65 mol) was added to a solution of 8-(4-methoxy-3-methylphenyl)-1,4-dioxaspiro[4.5]decan-8-ol (275 g, 0.99 mol), allyltrimethylsilane (180.62 g, 1.58 mol), and dry DCM (3 L) at −65° C. under N$_2$. The reaction mixture was stirred at −65° C. for 1 h, and then the 4 batches were carefully poured into sat. aq. NaHCO$_3$ (10 L). This mixture was extracted with DCM (5 L×3). The combined organic layers were washed with brine (5 L), dried over Na$_2$SO$_4$, filtered, and concentrated to give 8-allyl-8-(4-methoxy-3-methylphenyl)-1,4-dioxaspiro[4.5]decane (1350 g) as a yellow oil. $^1$H NMR (400 MHz, CDCl$_3$): δ 7.17-7.01 (m, 2H), 6.85-6.75 (m, 1H), 5.53-5.37 (m, 1H), 5.01-4.85 (m, 2H), 3.99-3.87 (m, 4H), 3.82 (s, 3H), 2.37-2.29 (m, 1H), 2.28-2.21 (m, 5H), 2.20-2.10 (m, 2H), 1.82-1.71 (m, 2H), 1.70-1.52 (m, 3H).

Step 3: 4-Allyl-4-(4-methoxy-3-methylphenyl)cyclohexanone 3 batches were run in parallel: Water (450 mL) and then formic acid (285.95 g, 5.95 mol) were added to a solution of 8-allyl-8-(4-methoxy-3-methylphenyl)-1,4-dioxaspiro[4.5]decane (450 g) and THF (1.8 L) at rt. The reaction mixture was refluxed overnight, allowed to cool to rt, and then the 3 batches were poured into sat. aq. NaHCO$_3$ (3 L). This mixture was extracted with EA (3 L×3). The combined organic layers were washed with brine (3 L), dried over Na$_2$SO$_4$, filtered, concentrated, and then purified by chromatography on silica gel (petroleum ether/EtOAc=1/0-50/1) to give 4-allyl-4-(4-methoxy-3-methylphenyl)cyclohexanone (800 g, 69.3% over 2 steps) as a yellow oil. $^1$H NMR (400 MHz, CDCl$_3$): δ 7.16-7.06 (m, 2H), 6.80-6.73 (m, 1H), 5.48-5.30 (m, 1H), 4.96-4.79 (m, 2H), 3.77 (s, 3H), 2.48-2.35 (m, 2H), 2.32-2.05 (m, 9H), 1.89-1.77 (m, 2H).

Step 4: 4-Allyl-4-(4-methoxy-3-methylphenyl)cyclohexanecarbonitrile 3 batches were run in parallel: t-BuOK (299.69 g, 2.67 mol) was added portionwise over 1 h (keeping internal temp. <5° C.) to a solution of 4-allyl-4-(4-methoxy-3- methylphenyl)cyclohexanone (230 g, 890.25 mmol), Tos-MIC (260.72 g, 1.34 mol), and DME (2 L) at 0° C. under $N_2$. The mixture was stirred at rt for 2 h, and then the 3 batches were poured into sat. aq. $NH_4Cl$ (5 L). The mixture was extracted with EtOAc (5 L×2). The combined organic layers were washed with brine (5 L), dried over $Na_2SO_4$, filtered, concentrated, and then purified by chromatography on silica gel (petroleum ether/EtOAc=1/0-50/1) to give 4-allyl-4-(4-methoxy-3-methylphenyl)cyclohexanecarbonitrile (508 g, 70.6%) as a yellow oil. $^1H$ NMR (400 MHz, $CDCl_3$): δ 7.13-6.99 (m, 2H), 6.83-6.75 (m, 1H), 5.51-5.31 (m, 1H), 5.03-4.85 (m, 2H), 3.84 (s, 3H), 2.58-2.48 (m, 1H), 2.38-2.02 (m, 7H), 1.98-1.79 (m, 2H), 1.78-1.56 (m, 3H), 1.54-1.40 (m, 1H).

Step 5: 4-(2,3-Dihydroxypropyl)-4-(4-methoxy-3-methylphenyl)cyclohexanecarbonitrile 3 batches were run in parallel: NMO (242.66 g, 2.07 mol) and then $K_2OsO_4·2H_2O$ (7.63 g, 20.71 mmol) were added to a solution of 4-allyl-4-(4-methoxy-3-methylphenyl)cyclohexanecarbonitrile (186 g, 690.47 mmol), acetone (2 L), and $H_2O$ (250 mL) at 0° C. The reaction was allowed to warm to rt and stirred for 2 h. The 3 batches were poured into sat. aq. $Na_2SO_3$ (4 L), and the mixture was extracted with EtOAc (3 L×2). The combined organic layers were washed with brine (3 L), dried over $Na_2SO_4$, filtered, concentrated, and then purified by chromatography on silica gel (petroleum ether/EtOAc=5/1-1/2) to give 4-(2,3-dihydroxypropyl)-4-(4-methoxy-3-methylphenyl)cyclohexanecarbonitrile (600 g, 95.4%) as a yellow oil. $^1H$ NMR (400 MHz, $CDCl_3$): δ 7.21-7.01 (m, 2H), 6.87-6.74 (m, 1H), 3.83 (s, 3H), 3.65-3.49 (m, 1H), 3.35-3.17 (m, 2H), 2.60-2.45 (m, 1H), 2.41-2.11 (m, 5H), 2.01-1.81 (m, 4H), 1.79-1.38 (m, 6H).

Step 6: 4-(4-Methoxy-3-methylphenyl)-4-(2-oxoethyl)cyclohexanecarbonitrile 3 batches were run in parallel: $NaIO_4$ (169.20 g, 791.05 mmol) was added portionwise over 30 min (keeping internal temp. <5° C.) to a solution of 4-(2,3-dihydroxypropyl)-4-(4-methoxy-3-methylphenyl)cyclohexanecarbonitrile (200 g, 659.21 mmol), THF (2 L), and $H_2O$ (1 L) at 0° C. The mixture was stirred at rt for 3 h, and then the 3 batches were poured into water (2 L). The mixture was extracted with EtOAc (2 L×2). The combined organic layers were washed with brine (2 L), dried over $Na_2SO_4$, filtered, and concentrated to give 4-(4-methoxy-3-methylphenyl)-4-(2-oxoethyl)cyclohexanecarbonitrile (510 g) as a colorless oil. $^1H$ NMR (400 MHz, $CDCl_3$): δ 9.43-9.22 (m, 1H), 7.20-6.99 (m, 2H), 6.87-6.71 (m, 1H), 3.82 (s, 3H), 2.63-2.48 (m, 2H), 2.46-2.36 (m, 1H), 2.33-2.13 (m, 4H), 2.02-1.71 (m, 5H), 1.71-1.57 (m, 2H).

Step 7: 4-(2-Hydroxyethyl)-4-(4-methoxy-3-methylphenyl)cyclohexanecarbonitrile 3 batches were run in parallel: $NaBH_4$ (35.55 g, 939.73 mmol) was added to a solution of 4-(4-methoxy-3-methylphenyl)-4-(2-oxoethyl)cyclohexanecarbonitrile (170 g) and THF (1.7 L) at 0° C. under $N_2$. The mixture was stirred at rt for 3 h, and then the 3 batches were poured into ice-cold water (3 L). This mixture was extracted with EtOAc (1.5 L×2). The combined organic layers were washed with brine (2 L), dried over $Na_2SO_4$, filtered, concentrated to give 4-(2-hydroxyethyl)-4-(4-methoxy-3-methylphenyl)cyclohexanecarbonitrile (495 g) as a colorless oil. $^1H$ NMR (400 MHz, $CDCl_3$): δ 7.18-6.97 (m, 2H), 6.88-6.71 (m, 1H), 3.85-3.78 (m, 3H), 3.76-3.70 (m, 1H), 3.44-3.33 (m, 2H), 2.71-2.69 (m, 0.5H), 2.60-2.48 (m, 0.5H), 2.37-2.35 (m, 0.5H), 2.27-2.19 (m, 3H), 2.14-2.12 (m, 0.5H), 1.96-1.79 (m, 5H), 1.78-1.61 (m, 3H), 1.58-1.45 (m, 1H).

Step 8: 4-(2-Bromoethyl)-4-(4-methoxy-3-methylphenyl)cyclohexanecarbonitrile 3 batches were run in parallel: A solution of $PPh_3$ (316.62 g, 1.21 mol) and DCM (1 L) was added dropwise over 1 h to a solution of 4-(2-hydroxyethyl)-4-(4-methoxy-3-methylphenyl)cyclohexanecarbonitrile (165 g), $CBr_4$ (300.24 g, 905.37 mmol), and DCM (1.5 L) at 0° C. under $N_2$. The mixture was stirred at rt for 1.5 h, combined with the other 2 batches, and concentrated. The crude product was triturated in MTBE (5 L) at rt overnight. The solid was removed by filtration, the cake was washed with MTBE (500 mL×2), and the filtrate was concentrated and then purified by chromatography on silica gel (petroleum ether/EtOAc=30/1) to give 4-(2-bromoethyl)-4-(4-methoxy-3-methylphenyl)cyclohexanecarbonitrile (530 g, 80%) as a white solid. $^1H$ NMR (400 MHz, $CDCl_3$): δ 7.11-6.96 (m, 2H), 6.86-6.73 (m, 1H), 3.87-3.73 (m, 3H), 3.09-2.93 (m, 2H), 2.78-2.68 (m, 0.5H), 2.62-2.50 (m, 0.5H), 2.38-2.34 (m, 1H), 2.28-2.18 (m, 3H), 2.17-2.10 (m, 2H), 2.08-1.99 (m, 1H), 1.99-1.79 (m, 3H), 1.77-1.45 (m, 3H).

Step 9: 4-(4-Methoxy-3-methylphenyl)bicyclo [2.2.2]octane-1-carbonitrile 3 batches were run in parallel: LDA (420 mL, 840 mmol, 2 M in THF) was added dropwise over 1 h to a solution of 4-(2-bromoethyl)-4-(4-methoxy-3-methyl-phenyl)cyclohexanecarbonitrile (143 g, 425.26 mmol), HMPA (381.03 g, 2.13 mol), and THF (1430 mL) at −65° C. under $N_2$. The mixture was stirred at −65° C. for 3 h, and then the 3 batches were poured into sat. aq. $NH_4Cl$ (5 L). This mixture was extracted with EtOAc (3 L×2). The combined organic layers were washed with water (3 L), washed with brine (3 L), dried over $Na_2SO_4$, filtered, concentrated, and then triturated in EA:Hexane (1:30, 775 mL) at rt overnight. The mixture was filtered, and the filter cake was washed with EA:Hexane (1:30, 150 mL) and dried under vacuum to give 4-(4-methoxy-3-methylphenyl)bicyclo[2.2.2]octane-1-carbonitrile (240 g, 73%) as a yellow solid. $^1H$ NMR (400 MHz, $CDCl_3$): δ 7.13-6.98 (m, 2H), 6.83-6.73 (m, 1H), 3.82 (s, 3H), 2.22 (s, 3H), 2.12-1.98 (m, 6H), 1.94-1.80 (m, 6H).

Step 10: 4-(4-Methoxy-3-methylphenyl)bicyclo [2.2.2]octane-1-carbaldehyde 3 batches were run in parallel: DIBAL-H (1 M PhMe, 830 mL, 830 mmol) was added to a solution of 4-(4-methoxy-3-methyl-phenyl)bicyclo[2.2.2]octane-1-carbonitrile (106 g, 415.11 mmol) in DCM (1 L) at −65° C. under $N_2$. The mixture was stirred at −65° C. for 1 h, and then the 3 batches were poured into sat. aq. NaK tartrate (3 L) and diluted by DCM (1.5 L). This mixture was stirred at rt for 3 h. The organic layer was separated, and the aqueous phase was extracted with DCM (2 L×2). The organic layers were combined, washed with brine (3 L), dried over $Na_2SO_4$, filtered, and concentrated to give 4-(4-methoxy-3-methylphenyl)bicyclo[2.2.2]octane-1-carbaldehyde (336 g) as a yellow solid. $^1H$ NMR (400 MHz, DMSO-$d_6$): δ 9.50-9.43

(m, 1H), 7.11-7.00 (m, 2H), 6.83-6.79 (m, 1H), 3.77-3.68 (m, 3H), 2.18-2.02 (m, 3H), 1.82-1.72 (m, 6H), 1.71-1.60 (m, 6H).

Step 11: Potassium-hydroxy(4-(4-methoxy-3-methylphenyl)bicyclo[2.2.2]octan-1-yl)methanesulfonate 6 batches were run in parallel: Aqueous potassium metabisulfite (2 M, 54 mL, 108 mmol) was added over 10 min to a solution of 4-(4-methoxy-3-methyl-phenyl)bicyclo[2.2.2]octane-1-carbaldehyde (56 g) in THF (300 mL) at 45° C. The mixture was stirred for 3.5 h at 45° C., allowed to cool to rt, and then stirred at rt overnight. The 6 batches were filtered, and the filter cake was washed with PE (400 mL) and dried under vacuum to give potassium-hydroxy(4-(4-methoxy-3-methylphenyl)bicyclo[2.2.2]octan-1-yl)methanesulfonate (381 g, 81% over 2 steps) as a white solid. $^1$H NMR (400 MHz, DMSO-d$_6$) 7.12-6.97 (m, 2H), 6.88-6.71 (m, 1H), 4.51 (d, 1H), 3.73 (s, 3H), 3.56 (d, 1H), 2.11 (s, 3H), 1.88-1.56 (m, 12H).

Step 12: 4-(4-Methoxy-3-methylphenyl)bicyclo[2.2.2]octane-1-carbaldehyde 6 batches were run in parallel: Saturated aq. Na$_2$CO$_3$ (300 mL) was added to a mixture of potassium-hydroxy(4-(4-methoxy-3-methylphenyl)bicyclo[2.2.2]octan-1-yl)methanesulfonate (63.5 g, 167.76 mmol) and DCM (300 mL) at rt under N$_2$. The mixture was stirred for 1 h, and then the 6 batches were poured into a mixture of DCM (1500 mL) and H$_2$O (1500 mL). The organic layer was separated, and the aqueous phase was extracted with DCM (1500 mL×3). The combined organic layers were washed with brine (2 L), dried over Na$_2$SO$_4$, filtered, and concentrated to give 4-(4-methoxy-3-methylphenyl)bicyclo[2.2.2]octane-1-carbaldehyde (240.3 g, 92%) as a white solid. $^1$H NMR (400 MHz, DMSO-d$_6$): δ 9.52-9.41 (m, 1H), 7.14-7.02 (m, 2H), 6.84-7.80 (m, 1H), 3.73 (s, 3H), 2.12 (s, 3H), 1.83-1.72 (m, 6H), 1.71-1.56 (m, 6H); LCMS: 259.1 [M+H]$^+$.

Example 2: Preparation of 4-(1-(tert-butyl)-1H-pyrazol-4-yl)pyridin-2-amine (Intermediate 2)

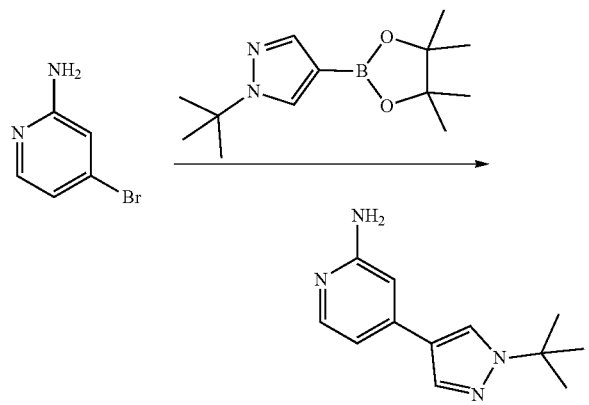

2-Methyltetrahydrofuran (10 mL), Pd(dppf)Cl$_2$, and then aq. K$_2$CO$_3$ (3 M, 10 mL, 30 mmol) were added to 4-bromopyridin-2-amine (1.87 g, 10.8 mmol) and 1-(tert-butyl)-4-(4,4,5,5-tetramethyl-1,3,2-dioxaborolan-2-yl)-1H-pyrazole (2.50 g, 10.0 mmol) in a 40 mL vial. The reaction was degassed with 3 vacuum/N$_2$ cycles, heated at 50° C. for 21 h, and then allowed to cool to rt. The layers were separated, and the organic layer was washed with sat'd aq. NaK tartrate (25 mL) and then washed with brine (25 mL). The aqueous layers were back extracted with 2-methyltetrahydrofuran (25 mL). The combined organics were dried (MgSO$_4$), filtered, concentrated, and then dried under vacuum for 1 h. A suspension of the crude material and MTBE (25 mL) was refluxed for 2 h, allowed to cool to rt overnight, and then filtered. The filter cake was washed with MTBE (2×3 mL) and then dried under vacuum to give 4-(1-(tert-butyl)-1H-pyrazol-4-yl)pyridin-2-amine (1.15 g, 53%). $^1$H NMR (400 MHz, DMSO-d$_6$): δ 8.27 (s, 1H), 7.86-7.82 (m, 2H), 6.74 (d, 1H), 6.61 (s, 1H), 5.77 (s, 2H), 1.54 (s, 9H); LCMS: 217.1 [M+H]*.

Example 3: Preparation of trans-4-((tert-butyldimethylsilyl)oxy)cyclohexanecarboxylic acid (Intermediate 3)

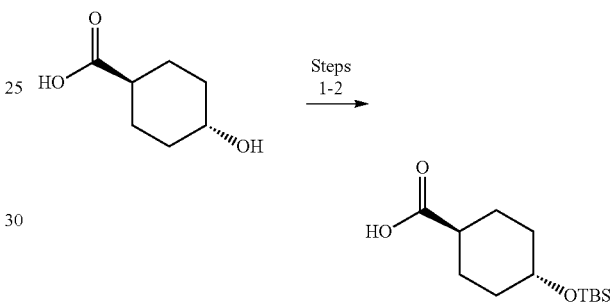

Step 1: Trans-tert-Butyldimethylsilyl 4-((tert-butyldimethylsilyl)oxy)cyclohexanecarboxylate tert-Butyldimethylsilyl chloride (31.47 g, 208.8 mmol) was added to a mixture of trans-4-hydroxy-cyclohexanecarboxylic acid (10.03 g, 69.57 mmol), imidazole (18.96 g, 278.5 mmol), and DMF (140 mL) at rt under N$_2$ (reaction exothermed to 32° C.). The reaction was stirred at rt for 2 h and then diluted with diethyl ether (300 mL). The organic layer was washed with (2×300 mL 1 N HCl and then 300 mL brine), dried (Na$_2$SO$_4$), filtered, and concentrated to give trans-tert-butyldimethylsilyl 4-((tert-butyldimethylsilyl)oxy)cyclohexanecarboxylate (31.5 g) as a clear oil. $^1$H NMR (400 MHz, DMSO-d$_6$): δ 3.61-3.53 (m, 1H), 2.26-2.18 (m, 1H), 2.04-1.96 (m, 2H), 1.92-1.85 (m, 2H), 1.51-1.39 (m, 2H), 1.39-1.27 (m, 2H), 0.94 (s, 9H), 0.89 (s, 9H), 0.26 (s, 6H), 0.06 (s, 6H).

Step 2: trans-4-((tert-Butyldimethylsilyl)oxy)cyclohexanecarboxylic Acid

Potassium carbonate (58.01 g, 419.7 mmol) in H$_2$O (300 mL) was added to a mixture of trans-tert-butyldimethylsilyl 4-((tert-butyldimethylsilyl)oxy)cyclohexanecarboxylate (31.5 g crude, 69.6 mmol), ethanol (1000 mL) and THF (300 mL) at rt under N$_2$. The reaction was stirred at rt for 3 h, concentrated until 300 mL remained, diluted with brine (600 mL), and then acidified to pH 2-3 with 20% NaHSO$_4$ (550 mL). The aqueous layer was extracted with diethyl ether (800 mL). The organic layer was washed (800 mL brine), dried (Na$_2$SO$_4$), filtered, concentrated, and dried under high vacuum (to remove silanol byproducts) to give trans-4-

((tert-butyldimethylsilyl)oxy)cyclohexanecarboxylic acid (17.3 g, 96% over 2 steps) as a white solid. $^1$H NMR (400 MHz, DMSO-$d_6$): δ 12.30 (br s, 1H), 3.59-3.51 (m, 1H), 2.15-2.05 (m, 1H), 1.88-1.74 (m, 4H), 1.41-1.29 (m, 2H), 1.28-1.16 (m, 2H), 0.84 (s, 9H), 0.02 (s, 6H).

Example 4: Preparation of 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1)

Step 1: 4-(1-(tert-Butyl)-1H-pyrazol-4-yl)-N-((4-(4-methoxy-3-methylphenyl)bicyclo[2.2.2]octan-1-yl)methyl)pyridin-2-amine A mixture of intermediate 1 (1.0 equiv) and intermediate 2 (1.1 equiv) in methanol (7.5 vol) and acetic acid (0.33 equiv) was heated at 55° C. for at least 3 h. The reaction mixture was cooled to room temperature and 2-methylpyridine borane complex (1.0 equiv) was added as a solid over at least 20 minutes. The reaction was stirred at rt overnight and water (12.0 vol) was added within at least 60 minutes.

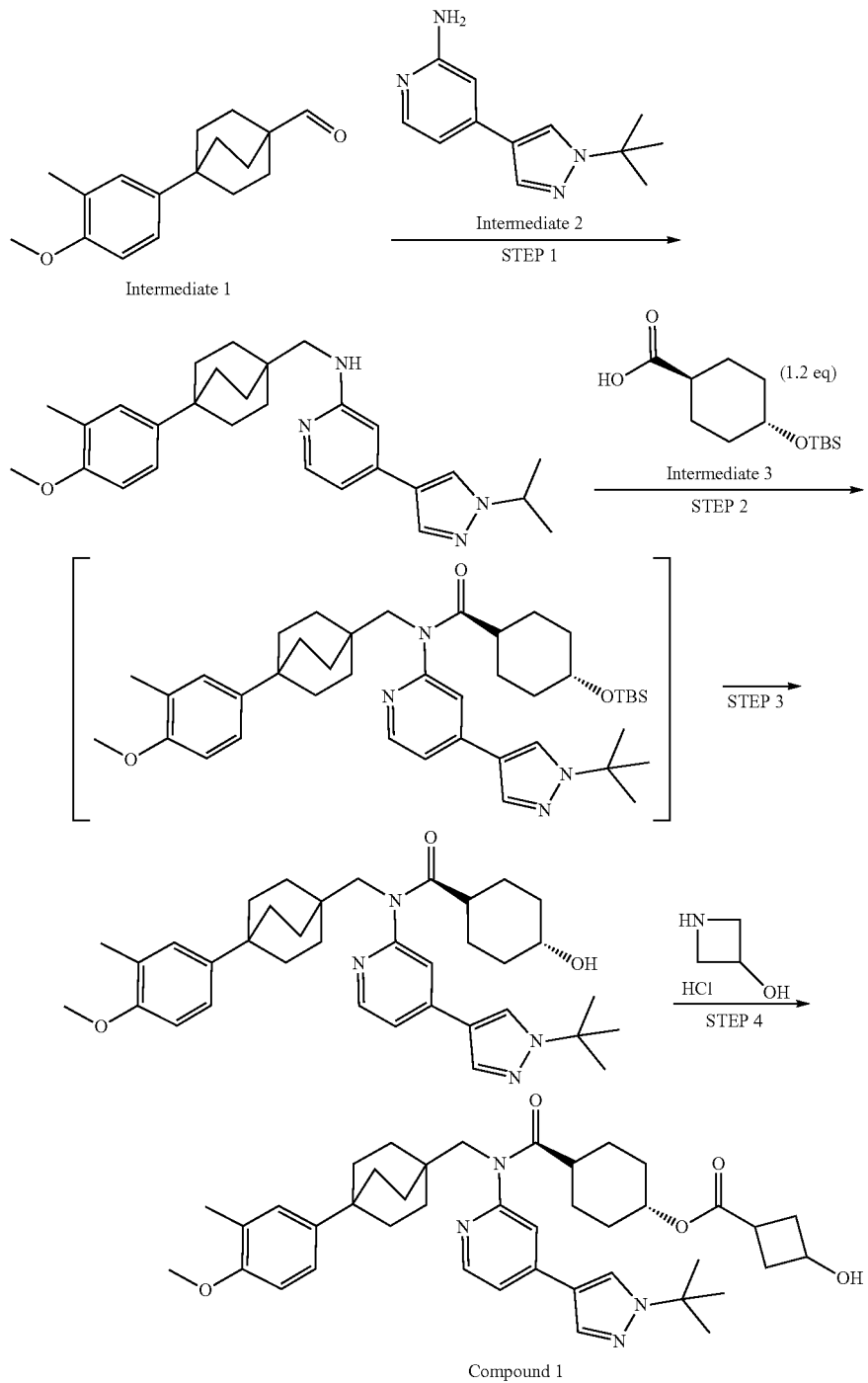

The suspension was stirred for at least 2 h. A solid was collected by filtration, washed with water/methanol (2:1) (2×1 vol), TBME (2×2 vol), and heptane (2×2 vol), and dried in a rotary evaporator at 50° C. to afford 4-(1-(tert-butyl)-1H-pyrazol-4-yl)-N-((4-(4-methoxy-3-methylphenyl)bicyclo[2.2.2]octan-1-yl)methyl)pyridin-2-amine.

Steps 2 and 3: trans-N-(4-(1-(tert-Butyl)-1H-pyrazol-4-yl)pyridin-2-yl)-4-hydroxy-N-((4-(4-methoxy-3-methylphenyl)bicyclo[2.2.2]octan-1-yl)methyl)cyclohexanecarboxamide To a mixture of 4-(1-(tert-butyl)-1H-pyrazol-4-yl)-N-((4-(4-methoxy-3-methylphenyl)bicyclo[2.2.2]octan-1-yl)methyl)pyridin-2-amine (1.0 equiv) and intermediate 3 (1.2 equiv) in dichloromethane (7.5 vol) and triethylamine (4.0 equiv) at 0° C. was added a T3P solution in dichloromethane (2.0 equiv) over 0.5 h. The reaction mixture was warmed to room temperature and stirred at least 12 h. The reaction mixture was cooled to 5° C. and quenched with the addition of water in 2 portions (0.05 vol and 6.0 vol). The mixture was warmed to room temperature and stirred for at least 2 h. The organic layer was collected and washed with water. The dichloromethane solvent was replaced with 2-methyltetrahydrofuran (5.4 vol) in vacuo. Methanol (2.4 vol) and water (2 vol) were added to the solution followed by aqueous HCl (32%) (1.9 equiv). The reaction mixture was stirred at room temperature for at least 2 h. To the mixture was added 9.5% aqueous $NaHCO_3$ solution (4 vol). The organic layer was collected, washed with brine, dried over $Na_2SO_4$, and filtered over Celite. The filtrate was concentrated in vacuo and TBME (9 vol) was added. A solid was collected by filtration, washed with TBME and heptane, and dried in vacuo at 60° C. to afford trans-N-(4-(1-(tert-butyl)-1H-pyrazol-4-yl)pyridin-2-yl)-4-hydroxy-N-((4-(4-methoxy-3-methylphenyl)bicyclo[2.2.2]octan-1-yl)methyl)cyclohexanecarboxamide.

Step 4: 4-((4-(1-(tert-Butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate (Compound 1)

To a solution of trans-N-(4-(1-(tert-butyl)-1H-pyrazol-4-yl)pyridin-2-yl)-4-hydroxy-N-((4-(4-methoxy-3-methylphenyl)bicyclo[2.2.2]octan-1-yl)methyl)cyclohexanecarboxamide in dichloromethane (8.0 vol) was added 1,1'-carbonyldiimidazole (1.5 equiv). The mixture was stirred at room temperature for at least 3.5 h. 3-Hydroxy azetidine hydrochloride (3.0 equiv) and then $iPr_2NEt$ (7.0 equiv) were added to this solution at room temperature. The reaction mixture was stirred at room temperature for at least 2.5 h. The reaction was quenched with 4.5% $NaHCO_3$ aqueous solution (6.0 vol). The organic layer is collected and the aqueous layer extracted one time with dichloromethane (2.0 vol). Methanol (0.8 vol) was added and the combined organic layers were washed twice with 20% $NH_4Cl$ solution (4.0 vol) and twice with water (4.0 vol). The organic layer was dried ($Na_2SO_4$) and the dichloromethane solvent was exchanged for ethyl acetate (4 vol). Heptane was added slowly (4 vol). The crude product was collected by filtration and washed with ethyl acetate:heptane (1:1). The crude product was dried in vacuo at 55° C. The crude product is purified in a hot slurry in ethyl acetate (5 vol) and collected by filtration. The product was washed with ethyl acetate and dried in vacuo at 55° C. to give 4-((4-(1-(tert-butyl)-1H-pyrazol-4-yl)pyridin-2-yl)((4-(4-methoxy-3-methylphenyl) bicyclo[2.2.2]octan-1-yl)methyl)carbamoyl)cyclohexyl 3-hydroxyazetidine-trans-1-carboxylate (Compound 1, Form 1).

II. Characterization of Forms

Example 5: X-Ray Powder Diffraction (XRPD)

Stoe Stadi P X-Ray Powder Diffractometer:
Stoe Stadi P equipped with a Mythen1K Detector; Cu-Ka1 radiation; standard measurement conditions: transmission; 40 kV and 40 mA tube power; curved Ge monochromator; 0.02° 2q step size, 12 s or 48 s step time, 1.5-50.5° 2q scanning range; detector mode: step scan; 1° 2q detector step; standard sample preparation: 10 to 20 mg sample was placed between two acetate foils, Mylar foils or Kapton foils; sample holder: Stoe transmission sample holder; the sample was rotated during the measurement.

XRPD analysis of Form 1 of Compound 1 (FIG. 1) showed Form 1 to be crystalline with characteristic peaks at 7.4° 2-Theta, 8.4° 2-Theta, 14.6° 2-Theta, 15.4° 2-Theta, 16.8° 2-Theta, 17.0° 2-Theta, 17.3° 2-Theta, 17.6° 2-Theta, 18.9° 2-Theta, and 19.3° 2-Theta.

XRPD analysis of Form 2 of Compound 1 (FIG. 4) showed Form 2 to be crystalline with characteristic peaks at 8.5° 2-Theta, 12.8° 2-Theta, 13.4° 2-Theta, 16.2° 2-Theta, 17.0° 2-Theta, 18.8° 2-Theta, 19.5° 2-Theta, and 20.5° 2-Theta.

XRPD analysis of Form 3 of Compound 1 (FIG. 7) showed Form 3 to be crystalline with characteristic peaks at 7.5° 2-Theta, 15.1° 2-Theta, 16.6° 2-Theta, 16.9° 2-Theta, 17.2° 2-Theta, 17.5° 2-Theta, and 18.7° 2-Theta.

XRPD analysis of Form 4 of Compound 1 (FIG. 10) showed Form 4 to be crystalline with characteristic peaks at 5.4° 2-Theta, 8.9° 2-Theta, 9.9° 2-Theta, 14.8° 2-Theta, 15.9° 2-Theta, 16.2° 2-Theta, 16.8° 2-Theta, 17.5° 2-Theta, 18.5° 2-Theta, and 20.1° 2-Theta.

Example 6: Thermo-Gravimetric Analysis (TGA)

TGA TG-FTIR was performed on a Netzsch Thermo-Microbalance TG 209, which is coupled to a Bruker FT-IR Spectrometer IFS 28. The measurements were carried out with aluminum crucibles with a micro pinhole under a nitrogen atmosphere and at a heating rate of 10° C./min over the range 25° C. to 300° C.

TGA of Form 1 of Compound 1 (FIG. 2) showed one small mass loss of 0.14% water from the start of the experiment to about 100° C. A second, mass loss of 0.43% was observed from sample decomposition (with onset at about 260° C.).

TGA of Form 2 of Compound 1 (FIG. 5) showed one small mass loss of 0.05% water from the start of the experiment to about 100° C. A second, mass loss of 0.59% was observed from sample decomposition (with onset at about 250° C.).

TGA of Form 3 of Compound 1 (FIG. 8) showed there was a small mass loss of 0.59%, corresponding to TBME. A second, mass loss of 0.42% was observed from sample decomposition (with onset at about 275° C.).

TGA of Form 4 of Compound 1 (FIG. 11) showed one small mass loss of 0.36% water starting at about 100° C. A second, mass loss of 0.91% was observed from sample decomposition (with onset at about 250° C.).

Example 7: Differential Scanning Calorimetry (DSC)

DSC Differential scanning calorimetry was carried out with a TA Instruments DSC Q2000 using hermetically sealed gold sample pans or hermetically sealed aluminum Tzero sample pans. The heating rate was 10° C. per minute.

DSC analysis (FIG. 3) of Form 1 of Compound 1 showed a sharp melting endotherm with onset at about 213° C. and a peak at about 215° C.

DSC analysis (FIG. 6) of Form 2 of Compound 1 showed a sharp melting endotherm with onset at about 212° C. and a peak at about 214° C.

DSC analysis (FIG. 9) of Form 3 of Compound 1 showed a sharp melting endotherm with onset at about 214° C. and a peak at about 216° C.

DSC analysis (FIG. 12) of Form 4 of Compound 1 showed an endotherm at about 164° C. and a second endotherm having an onset at about 209° C.

Example 8: Dynamic Vapor Sorption (DVS)

Sorption isotherms were obtained using a SMS DVS Intrinsic moisture sorption analyzer, controlled by DVS Intrinsic Control software v1.0.1.2 (or v1.0.1.3). The sample temperature was maintained at 25° C. by the instrument controls. The humidity was controlled by mixing streams of dry and wet nitrogen, with a total flow rate of 200 ml/min. The relative humidity (RH) was measured by a calibrated Rotronic probe (dynamic range of 1.0-100% RH), located near the sample. The weight change, (mass relaxation) of the sample as a function of % RH was constantly monitored by the microbalance (accuracy ±0.005 mg).

Figure 13:
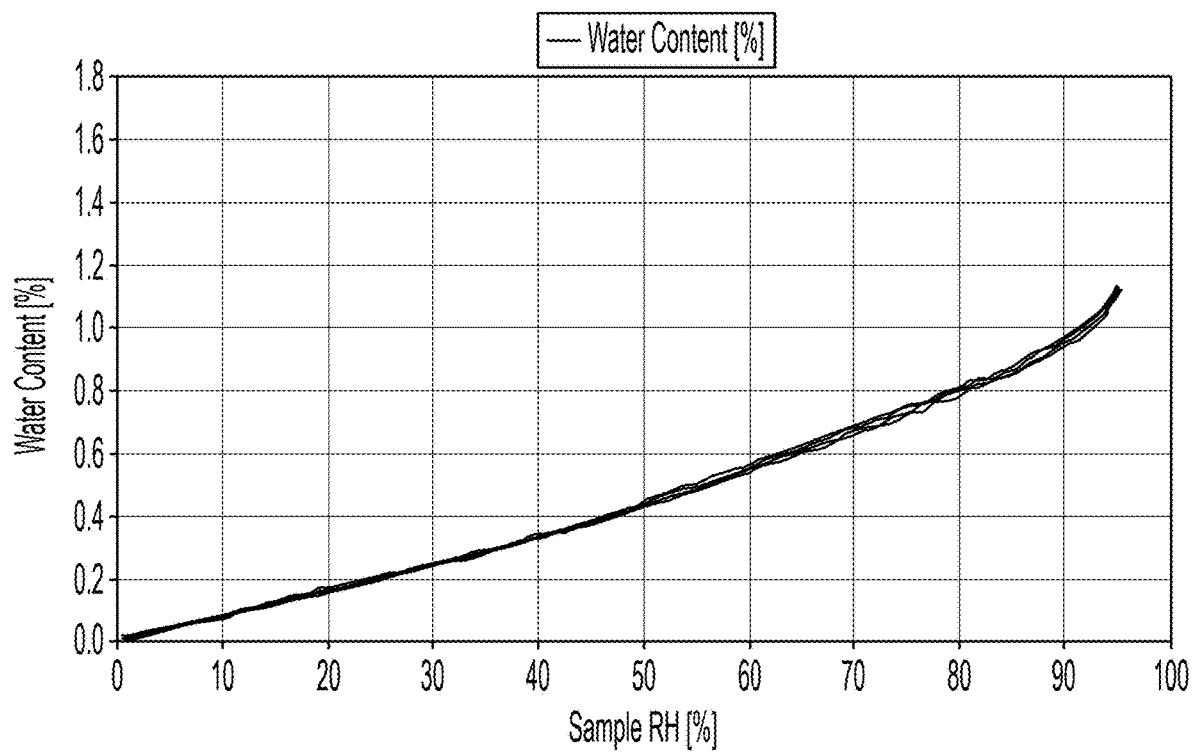
FIG. 13 illustrates a dynamic vapor sorption (DVS) isotherm (dynamic vapor sorption (DVS) isotherm plot) over two complete sorption/desorption cycles of Form 1 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

The DVS analysis of Form 1 of Compound 1 (FIG. 13) showed that the material was only slightly hygroscopic with water content of 1.2% at 95% RH. Post-DVS samples showed no significant changes in the XRPD pattern.

Figure 14:
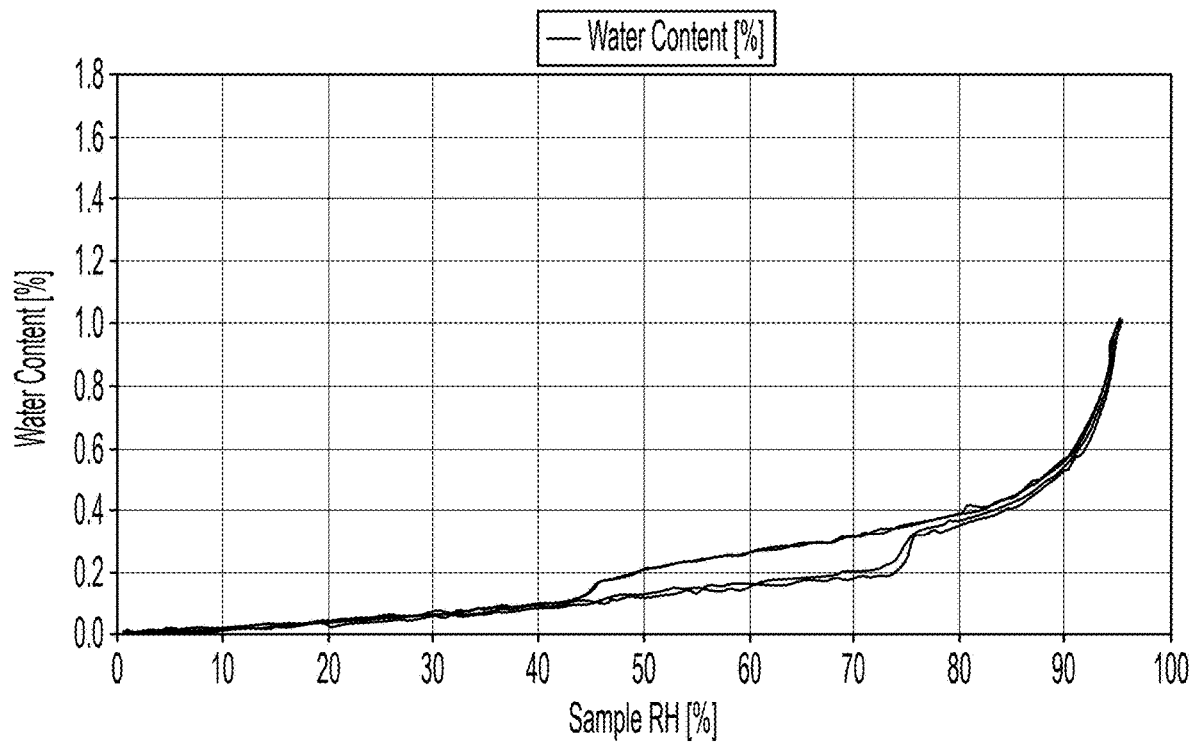
FIG. 14 illustrates a dynamic vapor sorption (DVS) isotherm (dynamic vapor sorption (DVS) isotherm plot) over two complete sorption/desorption cycles of Form 2 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

The DVS analysis of Form 2 of Compound 1 (FIG. 14) showed that the material was only slightly hygroscopic with water content of 1.0% at 95% RH. Post-DVS samples showed no significant changes in the XRPD pattern.

Figure 15:
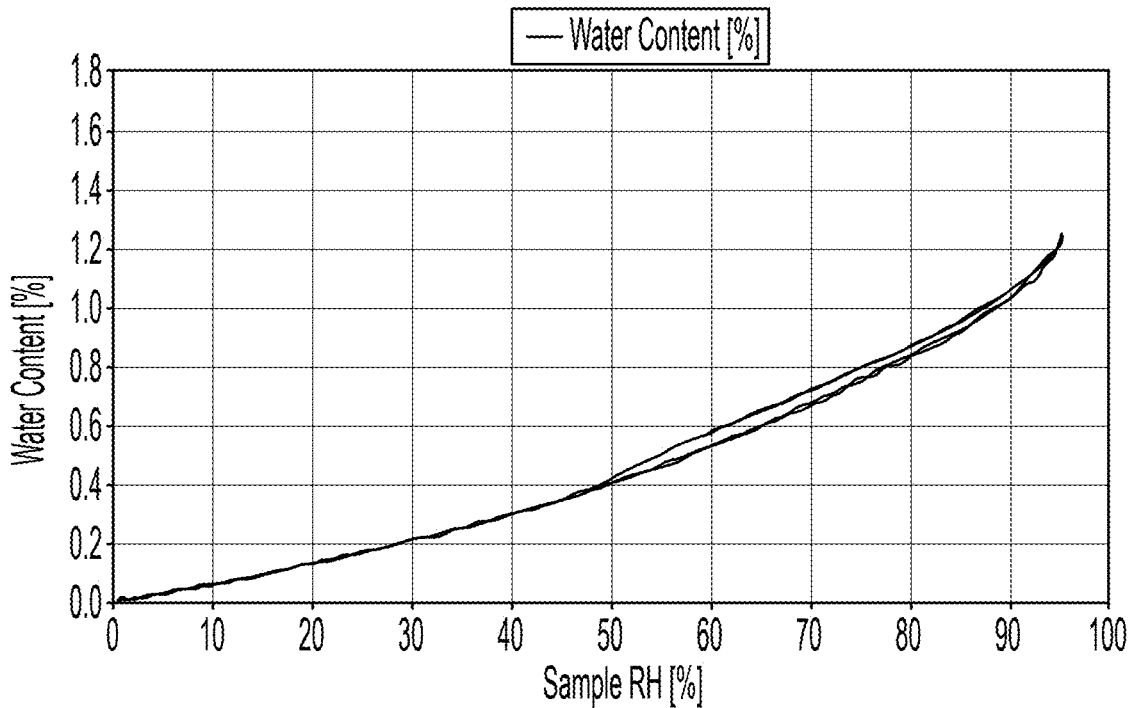
FIG. 15 Illustrates a dynamic vapor sorption (DVS) isotherm (dynamic vapor sorption (DVS) isotherm plot) over two complete sorption/desorption cycles of Form 3 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

The DVS analysis of Form 3 of Compound 1 (FIG. 15) showed that the material was only slightly hygroscopic with water content of 1.2% at 95% RH. Post-DVS samples showed no significant changes in the XRPD pattern.

Figure 16:
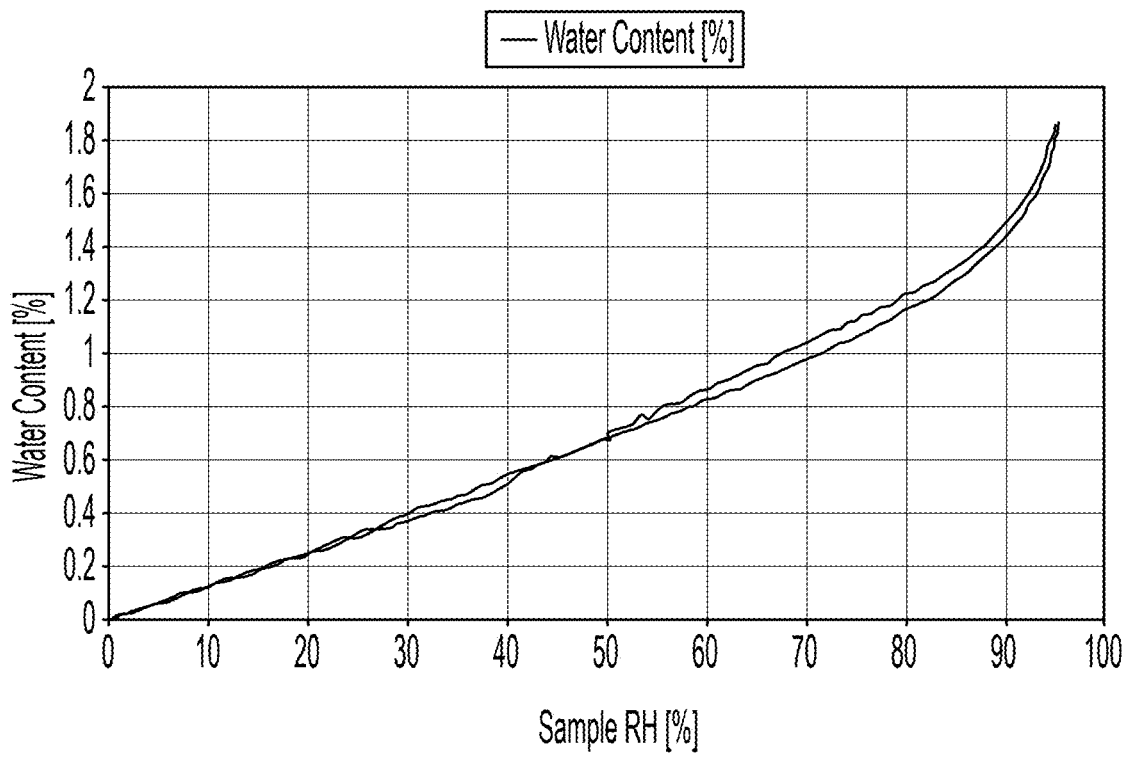
FIG. 16 illustrates a dynamic vapor sorption (DVS) isotherm (dynamic vapor sorption (DVS) isotherm plot) over two complete sorption/desorption cycles of Form 4 of crystalline 4-((4-(1-(tert-butyl)-1H-pyrazol-4-yl)pyridin-2-yl)((4-(4-methoxy-3-methylphenyl)bicyclo[2.2.2]octan-1-yl)methyl)carbamoyl)cyclohexyl 3-hydroxyazetidine-trans-1-carboxylate free base.

The DVS analysis of Form 4 of Compound 1 (FIG. 16) showed that the material was only slightly hygroscopic with water content of 1.9% at 95% RH. Post-DVS samples showed no significant changes in the XRPD pattern.

III. Crystallization Experiments

Example 9: Suspension Equilibrium Experiments

In a first set of experiments, amorphous Compound 1 was suspended in either acetonitrile, ethanol, methanol, 2-propanol, ethyl acetate, ethanol/heptane (1:1 v/v), acetone, or acetonitrile/water (1:2 v/v) at room temperature. The solid from each suspension was collected by filtration and air dried at room temperature. The solid was then vacuum dried (about 20 mbar, 80° C., overnight). The solid from each suspension afforded crystalline Compound 1, Form 1.

In another experiment, amorphous Compound 1 (1.0 g) was dissolved in 5.0 mL ethyl acetate/water (97:3 v/v) at room temperature and heated to 50° C. The solution was stirred at 50° C. and seeded with Compound 1, Form 2 (6 mg). The suspension cooled to room temperature followed by filter centrifugation, air drying at room temperature, and vacuum drying at 80° C. to afforded crystalline Compound 1, Form 2.

In another experiment, amorphous Compound 1 was suspended in TBME at room temperature. The solid was collected by filtration and air dried at room temperature. The solid was then vacuum dried at 80° C. to afford crystalline Compound 1, Form 3.

In another experiment, amorphous Compound 1 was suspended in TBME at room temperature. The suspension was seeded with Compound 1, Form 3, followed by suspension equilibrium for 2 h. The suspension was then stirred for four days. The solid was collected by filtration, air dried at room temperature, and then vacuum dried at 80° C. to afford crystalline Compound 1, Form 4.

IV. Compound 1 FXR Activity

Example 10: In Vitro FXR Assay (TK)

Seeding

CV-1 were seeded at a density of 2,000,000 cells in a T175 flask with DMEM+10% charcoal double-stripped FBS and incubated at 37° C. in 5% $CO_2$ for 18 h (O/N).

Transfection

After 18 h of incubation, the medium in the T175 flask was changed with fresh DMEM+10% charcoal super-stripped serum. In a polypropylene tube, 2500 µL OptiMEM (Life Technologies, Cat #31985-062) was combined with expression plasmids for hFXR, hRXR, TK-ECRE-luc and pCMX-YFP. The tube was then briefly vortexed and incubated at room temperature for 5 minutes. Transfection reagent (X-tremeGENE HP from Roche, Cat #06 366 236 001) was added to the OptiMEM/plasmid mixture vortexed and incubated at room temperature for 20 minutes. Following incubation, the transfection reagent/DNA mixture complex was added to cells in the T175 flask and the cells were incubated at 37° C. in 5% $CO_2$ for 18 h (O/N).

Addition of Compound 1

Compound 1 was serially diluted in DMSO and added to transfected CV-1 cells. The cells were then incubated for 18 hrs. The next day cells were lysed and examined for luminescence. Compound 1 TK hFXR: $EC_{50} \leq 0.01$ µM.

We claim:

1. A crystalline form of 4-((4-(1-(tert-butyl)-1H-pyrazol-4-yl) pyridin-2-yl)((4-(4-methoxy-3-methylphenyl) bicyclo[2.2.2]octan-1-yl)methyl)carbamoyl)cyclohexyl 3-hydroxyazetidine-trans-1-carboxylate that is Form 1 having the following properties: (a) an X-ray powder diffraction (XRPD) pattern with characteristic peaks at 7.4 2-Theta, 8.40 2-Theta, 14.60 2-Theta, 15.40 2-Theta, 16.80 2-Theta, 17.00 2-Theta, 17.30 2-Theta, 17.60 2-Theta, 18.90 2-Theta, and 19.30 2-Theta; and (b) a DSC thermogram with an endotherm having an onset at about 213° C.

2. A crystalline form of 4-((4-(1-(tert-butyl)-1H-pyrazol-4-yl) pyridin-2-yl)((4-(4-methoxy-3-methylphenyl) bicyclo[2.2.2]octan-1-yl)methyl)carbamoyl)cyclohexyl 3-hydroxyazetidine-trans-1-carboxylate that is Form 2 having the following properties: (a) an X-ray powder diffraction (XRPD) with characteristic peaks at 8.50 2-Theta, 12.80 2-Theta, 13.4° 2-Theta, 16.2° 2-Theta, 17.0° 2-Theta, 18.8° 2-Theta, 19.5° 2-Theta, and 20.50 2-Theta; and (b) a DSC thermogram with an endotherm having an onset at about 212° C.

3. A pharmaceutical composition comprising the crystalline form of claim 1, or a pharmaceutically acceptable salt, or solvate thereof, and at least one inactive ingredient selected from pharmaceutically acceptable carriers, diluents, and excipients.

4. A pharmaceutical composition comprising the crystalline form of claim 2, or a pharmaceutically acceptable salt, or solvate thereof, and at least one inactive ingredient selected from pharmaceutically acceptable carriers, diluents, and excipients.

5. A method of treating a gastrointestinal disease or condition in a mammal, comprising administering to the mammal a crystalline form of claim 1, or a pharmaceutically acceptable salt or solvate thereof.

6. The method of claim 5, wherein the gastrointestinal disease or condition is necrotizing enterocolitis, gastritis, ulcerative colitis, Crohn's disease, inflammatory bowel disease, irritable bowel syndrome, gastroenteritis, radiation induced enteritis, pseudomembranous colitis, chemotherapy induced enteritis, gastro-esophageal reflux disease (GERD), peptic ulcer, non-ulcer dyspepsia (NUD), celiac disease, intestinal celiac disease, post-surgical inflammation, gastric carcinogenesis, graft versus host disease or any combination thereof.

7. A method of treating a gastrointestinal disease or condition in a mammal, comprising administering to the mammal a crystalline form of claim 2, or a pharmaceutically acceptable salt or solvate thereof.

8. The method of claim 7, wherein the gastrointestinal disease or condition is necrotizing enterocolitis, gastritis, ulcerative colitis, Crohn's disease, inflammatory bowel disease, irritable bowel syndrome, gastroenteritis, radiation induced enteritis, pseudomembranous colitis, chemotherapy induced enteritis, gastro-esophageal reflux disease (GERD), peptic ulcer, non-ulcer dyspepsia (NUD), celiac disease, intestinal celiac disease, post-surgical inflammation, gastric carcinogenesis, graft versus host disease or any combination thereof.

\* \* \* \* \*